United States Patent [19]
Tanaka et al.

[11] Patent Number: 5,642,512
[45] Date of Patent: Jun. 24, 1997

[54] COMPILER WITH IMPROVED LIVE RANGE INTERFERENCE INVESTIGATION

[75] Inventors: Akira Tanaka, Kyoto; Junko Sayama, Settsu; Hiroshi Yukawa, Kyoto, all of Japan

[73] Assignee: Matsushita Electric Co., Osaka-fu, Japan

[21] Appl. No.: 508,136

[22] Filed: Jul. 27, 1995

[30] Foreign Application Priority Data

Sep. 13, 1994 [JP] Japan ..................... 6-218811

[51] Int. Cl.$^6$ ..................... G06F 9/45
[52] U.S. Cl. ..................... 395/705; 395/709
[58] Field of Search ..................... 395/700, 709

[56] References Cited

U.S. PATENT DOCUMENTS

| | | | |
|---|---|---|---|
| 4,571,678 | 2/1986 | Chaitin | 364/300 |
| 4,782,444 | 11/1988 | Munshi et al. | 364/300 |
| 5,107,418 | 4/1992 | Cramer et al. | 395/700 |
| 5,249,295 | 9/1993 | Briggs et al. | 395/650 |
| 5,355,494 | 10/1994 | Sistane et al. | 395/700 |
| 5,367,684 | 11/1994 | Smith | 395/700 |
| 5,418,958 | 5/1995 | Goebel | 395/700 |
| 5,530,866 | 6/1996 | Koblenz et al. | 395/700 |
| 5,555,417 | 9/1996 | Odnert et al. | 395/700 |
| 5,557,797 | 9/1996 | Yano | 395/650 |

*Primary Examiner*—Kevin A. Kriess
*Assistant Examiner*—Kakali Chaki
*Attorney, Agent, or Firm*—Price, Gess & Ubell

[57] ABSTRACT

The present invention is constructed so as to form simple blocks within each basic block, with the simple block internal live range storage unit 12 storing variables whose live ranges are entirely located within one simple block. basic block internal live range storage unit 13 stores variables whose live ranges are located within a number of simple blocks but, at the same time, entirely within one basic block, and the inter-basic block live range group storage unit 14 stores variables whose live ranges extend between basic blocks. The live range generation unit 15 detects the live ranges of the variables and stores the result in the live range storage unit 11, whilst also storing the variables during the detection of live ranges in one of the simple block internal live range storage unit 12, the basic block internal live range storage unit 13 and the inter-basic block live range group storage unit 14. Then, the live range interference investigation unit 16 investigates the interference of live ranges between only the live ranges of the variables to be assigned by means of comparing the live ranges. By doing so, the investigation process for the live ranges of variables can be speeded up, and hence the speed of the compiling operation can be improved.

18 Claims, 29 Drawing Sheets

CONSTRUCTION OF THE LIVE RANGE INTERFERENCE JUDGEMENT UNIT 9

Fig. 1A RELATED ART (a) CONVERSION INTO BASIC BLOCKS

```
s1:     t1  =  p1 +p2;
s2:     x4  =  t1 +p3;
s3:     t3  =  p1 *  p2;
s4:     y4  =  t3 +p3;
s5:     t5  =  p1 /  p2;
s6:     z4  = t5 +p3;
s7:     x   =  x4 +10;
s8:     y   =  x +y4;
s9:     z   =  y +z4;
s10:    a   =  y *  5;
s11:    b   =  x *  8;
    L60:
s12:    a1  =  a +10;
s13:    b   =  z +b;
s14:    c   =  a1 +b;
s15:    IFc <  100 GOTO L60 s16:    ℓ   =  a *  10;
s17:    m   =  b *  100;
s18:    s   =  ℓ +m;
```

Fig. 1B  RELATED ART

| VARIABLE | LIVE RANGE (GROUP OF INTERMEDIATE LANGUAGE STEPS ) |
|---|---|
| t1 | s2 |
| x4 | s3, s4, s5, s6, s7 |
| x | s8, s9, s10, s11 |
| t3 | s4 |
| y4 | s5, s6, s7, s8 |
| y | s9, s10 |
| t5 | s6 |
| z4 | s7, s8, s9 |
| z | s10, s11, s13, s12, s14, s15 |
| a | s11, s13, s12, s14, s15, s16 |
| b | s13, s12, s14, s15 s16, s17 |
| a1 | s13, s14 |
| c | s14, s15 |
| $\ell$ | s17, s18 |
| m | s18 |
| s | - |
| p1 | s1, s2, s3, s4, s5 |
| p2 | s1, s2, s3, s4, s5 |
| p3 | s1, s2, s3, s4, s5, s6 |

Fig. 1C  RELATED ART

| VARIABLE | INTERFERING VARIABLES |
|---|---|
| t1 | p1, p2, p3 |
| x4 | p1, p2, p3, t3, t5, z4 |
| x | y4, y, z4, z, a |
| t3 | x4, p1, p2, p3 |
| y4 | x, p1, p2, p3, x4, t5, z4 |
| y | x, z4, z |
| t5 | x4, y4, p3 |
| z4 | x, y, x4, y4 |
| z | x, y, a, b, a1, c |
| a | x, z, b, a1, c |
| b | z, a, a1, c, $\ell$ |
| a1 | z, a, b |
| c | z, a, b |
| $\ell$ | b, m |
| m | $\ell$ |
| s | - |

CONSTRUCTION OF THE OPTIMIZING APPARATUS 2

FLOWCHART FOR SIMPLE BLOCK GENERATION PROCESS

Fig. 5A
CORRESPONDING
TO STEP A5 IN
FIGURE 3
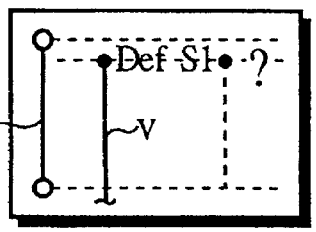
Fig. 5B
CORRESPONDING
TO STEP A6 IN
FIGURE 3
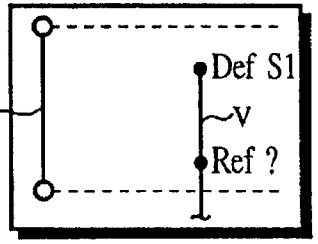
Fig. 5C
CORRESPONDING
TO STEP A7 IN
FIGURE 3
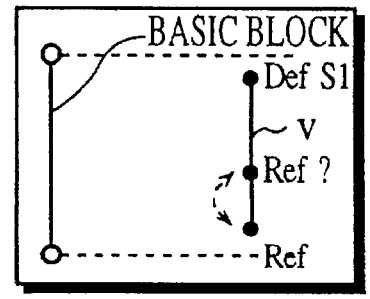
Fig. 5D
CORRESPONDING
TO STEP A8 IN
FIGURE 3
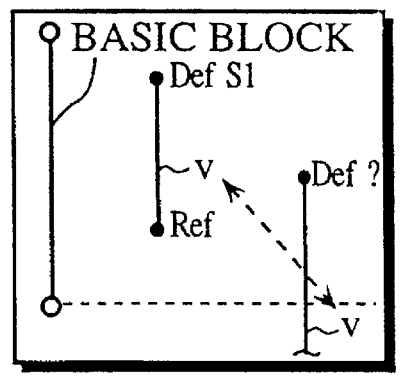

Fig. 5E
CORRESPONDING
TO STEP A9 IN
FIGURE 3
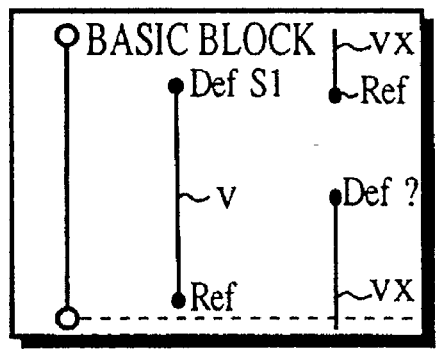
Fig. 5F
CORRESPONDING
TO STEP A10 IN
FIGURE 3
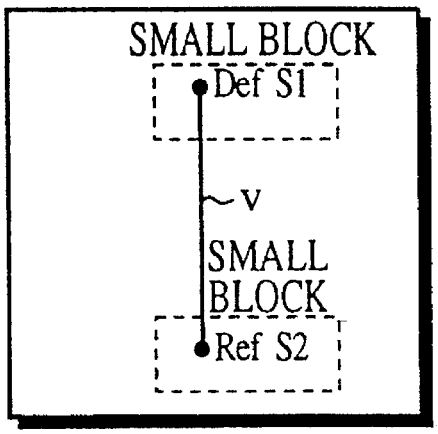
Fig. 5G
CORRESPONDING
TO STEP A11 IN
FIGURE 3
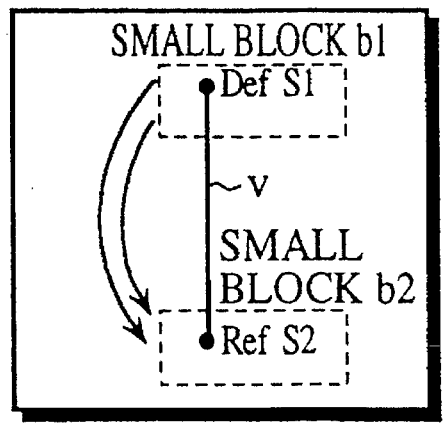

CONSTRUCTION OF THE RESOURCE
ASSIGNMENT APPARATUS 3

CONSTRUCTION OF THE LIVE RANGE
INTERFERENCE JUDGEMENT UNIT 9

FLOWCHART FOR LIVE RANGE INTERFERENCE INVESTIGATION PROCESS

CORRESPONDING TO STEP E2

CORRESPONDING TO STEP E5

CORRESPONDING TO STEP E7

CORRESPONDING TO STEP E9

CORRESPONDING TO STEP E11

CORRESPONDING TO STEP E12

Fig. 14A
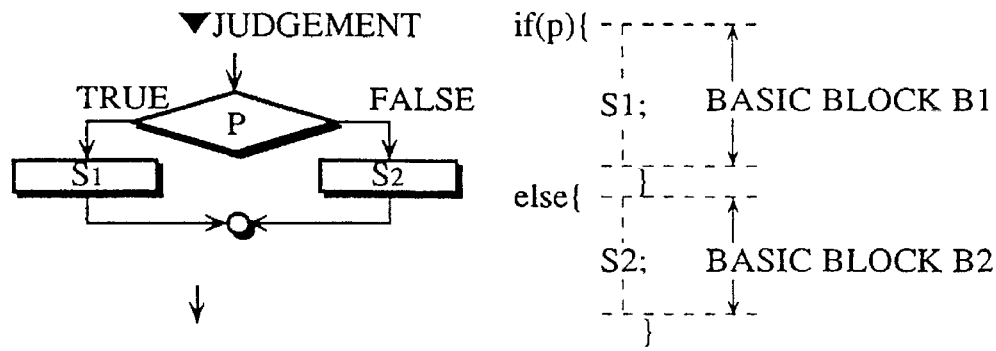
Fig. 14B
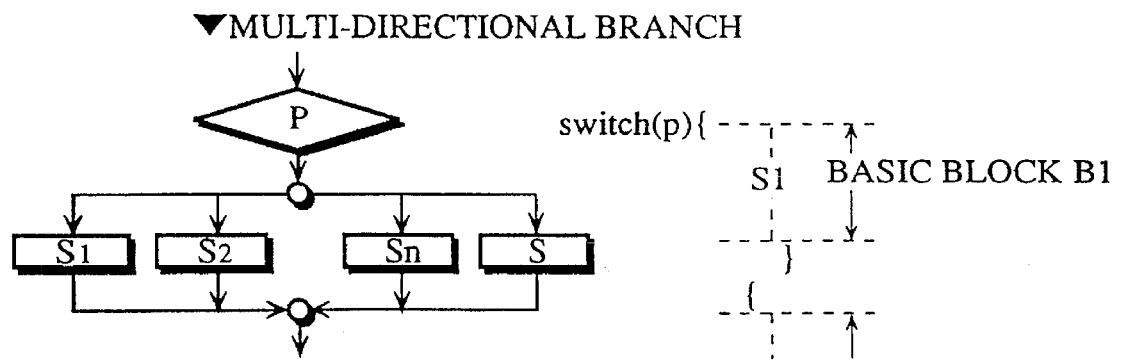
Fig. 14C        Fig. 14D
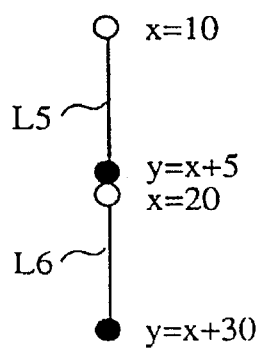 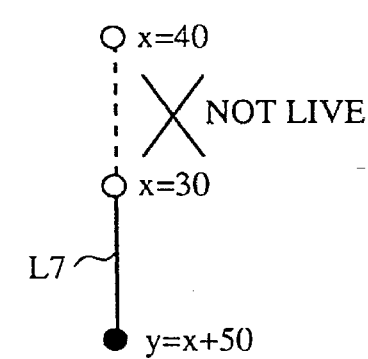 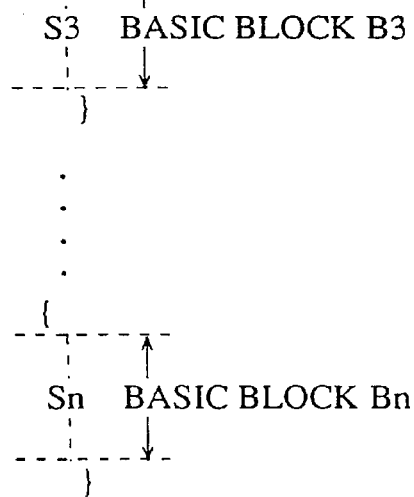

Fig. 15

SOURCE PROGRAM
.
.
.

```
x4 = p1 +p2 +p3;
y4 = p1 * p2 +p3;
z4 = p1 / p2 +p3;
 x = x4 +10;
 y = x +y4;
 z = y +z4;
 a = y * 5;
 b = x * 8;
do{
   a1 = a +10;
    b = z +b;
    c = a1 +b
}while(c<100);
    ℓ = a * 10;
  m = b * 100;
  s = ℓ +m;
```
.
.
.

Fig. 16

INTERMEDIATE LANGUAGE PROGRAM

```
s1:     t1 = p1 +p2;
s2:     x4 = t1 +p3;
s3:     t3 = p1 * p2;
s4:     y4 = t3 +p3;
s5:     t5 = p1 / p2;
s6:     z4 = t5 +p3;
s7:      x = x4 +10;
s8:      y = x +y4;
s9:      z = y +z4;
s10:     a = y * 5;
s11:     b = x * 8;
    L60:
s12:    a1 = a +10;
s13:     b = z +b;
s14:     c = a1 +b;
s15:    IFc < 100 GOTO L60 s16:     ℓ = a * 10;
s17:     m = b * 100;
s18:     s = ℓ +m;
```

=   SUBSTITUTION
+   ADDITION
*   MULTIPLICATION
/   DIVISION
<   LESS THAN OPERATION
IF A GOTO   LABEL
    JUMP TO LABEL WHEN CONDITION A IS SATISFIED
Sn   INTERMEDIATE LANGUAGE STEP

Fig. 17

CONVERSION INTO BASIC BLOCKS

```
s1:     t1 = p1 + p2;  ⎫
s2:     x4 = t1 + p3;  ⎪
s3:     t3 = p1 * p2;  ⎪
s4:     y4 = t3 + p3;  ⎪
s5:     t5 = p1 / p2;  ⎬ BASIC BLOCK B1
s6:     z4 = t5 + p3;  ⎪
s7:     x  = x4 + 10;  ⎪
s8:     y  = x + y4;   ⎪
s9:     z  = y + z4;   ⎪
s10:    a  = y * 5;    ⎪
s11:    b  = x * 8;    ⎭

L60:

s12:    a1 = a + 10;       ⎫
s13:    b  = z + b;        ⎪
s14:    c  = a1 + b;       ⎬ BASIC BLOCK B2
s15:    IFc < 100 GOTO L60 ⎭ s16:    ℓ = a * 10;    ⎫
s17:    m = b * 100;   ⎬ BASIC BLOCK B3
s18:    s = ℓ + m;     ⎭
```

Fig. 18A

DATA FLOW INFORMATION

| BASIC BLOCK | Livein | LiveOut | Def |
|---|---|---|---|
| B1 | p1,p2,p3 | z,a,b | t1,x4,t3,y4,t5, z4,x,y,z,a,b |
| B2 | z,a,b | a,b | a1,b,c |
| B3 | a,b | s | $\ell$,m,s |

Fig. 18B

DEFINITION-REFERENCE INFORMATION

| INTERMEDIATE LANGUAGE STEP | DEFINED VARIABLE | REFERENCE POSITION |
|---|---|---|
| s1 | t1 | s2 |
| s2 | x4 | s7 |
| s3 | t3 | s4 |
| s4 | y4 | s8 |
| s5 | t5 | s6 |
| s6 | z4 | s9 |
| s7 | x | s8,s11 |
| s8 | y | s9,s10 |
| s9 | z | s13 |
| s10 | a | s12,s16 |
| s11 | b | s13 |
| s12 | a1 | s14 |
| s13 | b | s14, s13, s17 |
| s14 | c | s15 |
| s15 | NONE | NONE |
| s16 | $\ell$ | s18 |
| s17 | m | s18 |
| s18 | s | |

Fig. 18C

REFERENCE-DEFINITION INFORMATION

| INTERMEDIATE LANGUAGE STEP | REFERENCED VARIABLE | DEFINITION POSITION |
|---|---|---|
| s1 | p1 | - |
|  | p2 | - |
| s2 | t1 | s1 |
|  | p3 | - |
| s3 | p1 | - |
|  | p2 | - |
| s4 | t3 | s3 |
|  | p3 | - |
| s5 | p1 | - |
|  | p2 | - |
| s6 | t5 | s5 |
|  | p3 | - |
| s7 | x4 | s2 |
| s8 | x | s7 |
|  | y4 | s4 |
| s9 | y | s8 |
|  | z4 | s6 |
| s10 | y | s8 |
| s11 | x | s7 |
| s12 | a | s10 |
| s13 | z | s9 |
|  | b | s11,s13 |
| s14 | a1 | s10 |
|  | b | s13 |
| s15 | c | s14 |
| s16 | a | s12 |
| s17 | b | s13 |
| s18 | $\ell$ | s16 |
|  | m | s17 |

Fig. 19

CONVERSION INTO BASIC BLOCKS

```
s1:     t1 = p1 + p2;
s2:     x4 = t1 + p3;
s3:     t3 = p1 * p2;
s4:     y4 = t3 + p3;
s5:     t5 = p1 / p2;
s6:     z4 = t5 + p3;
s7:     x  = x4 + 10;
s8:     y  = x + y4;
s9:     z  = y + z4;
s10:    a  = y * 5;
s11:    b  = x * 8;
    L60:
s12:    a1 = a + 10;
s13:    b  = z + b;
s14:    c  = a1 + b;
s15:    IFc < 100 GOTO L60
s16:    ℓ  = a * 10;
s17:    m  = b * 100;
s18:    s  = ℓ + m;
```

LIVE RANGE STORAGE UNIT

| VARIABLE | LIVE RANGE | LIVE SIMPLE BLOCK | LIVE BASIC BLOCK |
|---|---|---|---|
| t1 | s2 | PB7 | B1 |
| x4 | s7 | PB7 | B1 |
| x | s3, s4, s8, s5, s6, s9, s10, s11 | PB8, PB9, PB10, PB11 | B1 |
| t3 | s4 | PB8 | B1 |
| y4 | s8 | PB8 | B1 |
| y | s5, s6, s9, s10 | PB9, PB10 | B1 |
| t5 | s6 | PB9 | B1 |
| z4 | s9 | PB9 | B1 |
| z | s10, s11, s13, s12, s14, s15 | PB10, PB11, PB13, PB15 | B1, B2 |
| a | s11, s13, s12, s14, s15, s16 | PB11, PB13, PB15, PB18 | B1, B2, B3 |
| b | s13, s12, s14, s15, s16, s17 | PB13, PB15, PB18 | B2, B3 |
| a1 | s14 | PB15 | B2 |
| c | s15 | PB15 | B2 |
| ℓ | s17, s18 | PB18 | B3 |
| m | s18 | PB18 | B3 |
| s | - | - | - |

Fig. 22B

SIMPLE BLOCK INTERNAL
VARIABLE GROUP STORAGE UNIT 12

| SIMPLE BLOCK | SIMPLE BLOCK INTERNAL VARIABLE GROUP |
|---|---|
| PB7 | t1,x4 |
| PB8 | t3,y4 |
| PB9 | t5,z4 |
| PB10 | NONE |
| PB11 | NONE |
| PB13 | NONE |
| PB15 | a1,c |
| PB18 | $\ell$,m |

Fig. 22C

BASIC BLOCK INTERNAL
VARIABLE GROUP STORAGE UNIT 13

| BASIC BLOCK | SIMPLE BLOCK INTERNAL VARIABLE GROUP |
|---|---|
| B1 | x,y |
| B2 | NONE |
| B3 | NONE |

Fig. 22D

INTER-BASIC BLOCK
VARIABLE GROUP STORAGE UNIT 14

| VARIABLE |
|---|
| z,a,b |

Fig. 23

RESULT OF INVESTIGATION INTO
INTERFERENCE OF VARIABLES

| VARIABLE | |
|---|---|
| t1 | p1, p2, p3 |
| x4 | p1, p2, p3 |
| x | t3, y4, y, t5, z4, z, a, p1, p2, p3 |
| t3 | x, p1, p2, p3 |
| y4 | x, p1, p2, p3 |
| y | x, t5, z4, z, p1, p2, p3 |
| t5 | x, y, p3 |
| z4 | x, y |
| z | x, y, a, b, a1, c |
| a | x, z, b, a1, c |
| b | z, a, a1, c, $\ell$ |
| a1 | z, a, b |
| c | z, a, b |
| $\ell$ | b, m |
| m | $\ell$ |

COMPILER WITH IMPROVED LIVE RANGE INTERFERENCE INVESTIGATION

BACKGROUND OF THE INVENTION

1. Field of the Invention

The present invention relates to a compiler for compiling a program written in a high-level programming language into a machine language program.

2. Description of the Related Art

In recent years, there have been many improvements in the program development due to writing programs in high-level programming languages, such as C language.

By using high-level programming languages, the programmer can express such processes as the storage, operation and transmission of numerical values as operations (steps) which use the variables as their operands. Since these variables can be freely defined by the programmer, and are used only according to necessity, the programmer is free to write the program according to his/her desires and needs. By compiling these programs (known as source programs), they are converted into machine language programs which can be readily understood by the CPU in the computer. Operations in such machine language programs are expressed as machine language instructions which use the registers and memory as operands, so that during compiling it becomes necessary to assign the variables in the source program to the registers and memory. This assigning process is known as the resource assignment process. By optimally executing this resource assignment process, the code size of the machine language program produced can be reduced to a minimum, with the execution time of the generated program also being optimized.

As for the resources themselves, if memory and registers are compared, then it can be seen that the code size and the execution time of the machine language program can be reduced by setting the registers rather than the memory as operands. However, there are only a small number of registers available, then, before resource assignment is performed, it is usual to investigate the live ranges of the variables to see which variables can be assigned to the same register, with resource assignment being performed based on the results of this investigation. A live range is the range for which the stored value of a variable is valid, with FIG. 1A showing an example program and the live ranges of the variables used therein.

In this drawing, it can be seen that the live ranges for variable x4 and the variable t3 interfere (overlap), which means that these variables cannot be assigned to the same register. Variable t1 and variable t3 do not interfere, so that it is possible to assign these variables to the same register.

Next, the live ranges of all of the variables in the program are expressed as groups of intermediate language steps. Intermediate language steps are show in FIG. 1A as s1, s2, s3, s4 . . . etc. FIG. 1B shows the same live ranges expressed as groups of intermediate language steps. In the example shown in FIG. 1B, the live range of the variable t1 consists of only the intermediate language step s2, while the live range of the variable x consists of the intermediate language steps s8, s9, s10 and s11.

Next, for any pair of variables in the program, the intersection set of the groups of intermediate language steps is found. If the intersection set is vacant, then it is judged that the live ranges of the two variables do not interfere with one another. For the example shown in FIG. 1B, since there is no common element in the groups of intermediate language steps for the live ranges for variable x and variable x4, the intersection set is vacant, so that it is judged that the variables do not interfere with one another. However, since for variable x and variable t3 there is the common element s4 in the two groups of intermediate language steps for the live ranges, the intersection set is not vacant, and, as a result, it is Judged that the live ranges of variable x and variable t3 interfere with one another.

By repeating this investigation of intersection sets, it is determined which variables interfere with each other, with the result shown in FIG. 1C. It can be seen in this table that the live ranges of the variables p1, p2 and p3 interfere with that of the variable t1. In the same way, it can be seen that the live ranges of the variables p1, p2 and p3 also interfere with the live range of the variable x4.

By finding the interference between live ranges as described above, the number of variables to be assigned to a same register can be increased.

However, under the related art described above, there has been the problem that this investigation of the interference of live ranges has been very time-consuming. Given that it is quite normal for the total number of variables in a software program developed by a team of several programmers to be around one hundred, then when adding the variables automatically generated by the compiler in generating the intermediate language program, the total number of variables to be subject to the interference investigation can run to several hundred.

The interference investigation for the live ranges of the variables is performed by finding the group areas, with the number of times these group areas are calculated for n variables being $nC2=n(n-1)/2$ times (C=combinations), so that if the number n in the hundreds, this number of calculations of group areas will be extremely high. For example, if the number of variables n is set at 100, then nC2 will become 4,950, so that the compiler will have to perform 4,950 investigations of group intersection. If the number of variables n is set at 300, then nC2 will become 44,850, so that the compiler will have to perform 44,850 calculations of group intersection.

Furthermore, when there are a lot of variables which are only used once in the program, or which are redefined after being used once, then there will be an extreme amount of interference between live ranges, so that if there are only a limited number of registers, there is the problem that it will not be possible to assign all of the variables whose live ranges interfere to different registers.

SUMMARY OF THE INVENTION

In view of the problems described above, it is a first object of the present invention to provider a compiler which can greatly reduce the processing time needed for the investigation of interference between the live ranges of variables.

In view of the problems described above, it is a second object of the present invention to provider a compiler which can increase the number of variables assigned to a register, even if there are a number of variables which are only used once in the program, or which are redefined after being used once.

The first object of the present invention can be achieved by a compiler for compiling a program composed of a plurality of instructions into a machine language program, comprising: a jump instruction detection unit for detecting jump instructions in the program and a jump destination instruction for each of the jump instructions; a division unit for dividing the program into basic blocks based on the jump instructions and the jump destination instructions detected by the jump instruction detection unit; a live range detection unit for detecting, for every variable in the program, a live range which is a range for which a variable in the program is valid, and for expressing a detection result for each variable as a set of instruction position information showing positions of instructions included in the live range: a basic block internal live variable detection unit for detecting every variable for which the live range detected by the live range detection unit is positioned entirely within one of the basic blocks and for expressing a detection result for each of the basic blocks as a basic block internal live variable group corresponded to an appropriate basic block; an inter-basic block live variable detection unit for detecting every variable for which the live range detected by the live range detection unit extends between basic blocks and for expressing a detection result as an inter-basic block live variable group; a first live range interference judgement device for taking two variables at a time from the interbasic block live variable group and, by finding an intersection set of sets of instruction position information corresponding to the live ranges of two variables, for judging whether there is interference between the live ranges; a second live range interference judgement device for taking two variables at a time from a basic block internal live variable group corresponded to a same basic block and, by calculating an intersection set of sets of instruction position information corresponding to the live ranges of the two variables, for judging whether there is interference between the live ranges; and a third live range interference judgement device for taking one variable at a time from a basic block internal live variable group corresponded to a basic block and one variable at a time from the inter-basic block live variable group and, by calculating an intersection set of sets of instruction position information corresponding to the live ranges of the two variables, for judging whether there is interference between the live ranges, wherein the compiler executes resource assignment using judgement results of the first, the second and the third live range interference judgement devices.

Also, the compiler may further comprise: a simple block formation unit for forming simple blocks inside each basic block, each of which is a series of instructions including at least one pair of a definition instruction which is an instruction setting a value of a variable and a reference instruction which is an instruction using the variable set by the definition instruction; a simple block internal live variable detection unit for detecting every variable in the basic block internal live variable groups whose live range is included in only one of the simple blocks, and for expressing a detection result for each of the simple blocks as a simple block internal live variable group corresponded to an appropriate simple block; and an inter-simple block live variable detection unit for detecting every variable in the basic block internal live variable groups whose live range extends between simple blocks, and for expressing a detection result as an inter-simple block live variable group for an appropriate basic block, wherein the second live range interference judgement device may include: a first live range interference judgement unit for taking two variables at a time from one of the inter-simple block live variable groups and, by calculating an intersection set of sets of instruction position information corresponding to the live ranges of the two variables, for judging whether there is interference between the live ranges; a second live range interference judgement unit for taking two variables at a time from a simple block internal live variable group corresponded to a same simple block and, by calculating an intersection set of sets of instruction position information corresponding to the live ranges of the two variables, for judging whether there is interference between the live ranges; and a third live range interference judgement unit for taking one variable at a time from a simple block internal live variable group corresponded to a simple block and one variable at a time from the inter-simple block live variable group and, by calculating an intersection set of sets of instruction position information corresponding to the live ranges of the two variables, for judging whether there is interference between the live ranges.

Also, the simple block generation unit may include: a definition instruction extraction unit for extracting one definition instruction at a time from one of the basic blocks formed by the division unit; a corresponding reference instruction detection unit for detecting a reference instruction corresponding to the definition instruction from the basic block including the definition instruction extracted by the definition instruction extraction unit; a definition instruction movement possibility judgement unit for judging whether it is possible to move the definition instruction to a position of the reference instruction detected by the corresponding reference instruction detection unit; a definition instruction movement unit for moving, when the definition instruction movement possibility judgement unit judges that movement is possible, the definition instruction for which movement is judged by the definition instruction movement possibility judgement unit to be possible to a point just before the reference instruction corresponding to the definition instruction and for synthesizing the definition instruction and the reference instruction into one simple block; and a simple block remaining instruction movement unit for moving, when the definition instruction moved by the definition instruction movement unit before movement is a final instruction in a simple block, every remaining instruction in a same simple block as the definition instruction moved by the definition instruction movement unit before movement to a point just before a movement destination of the definition instruction and for synthesizing every remaining instruction into a destination simple block.

The second object of the present invention can be achieved by a compiler for compiling a program, composed of a plurality of instructions, in which a number of simple blocks each of which is a series wherein at least one pair of a definition instruction for setting a value of a variable and a reference instruction which uses the value of the variable set by the definition variable are arranged in order, into a machine language program for which every variable in the program is assigned to one of registers and memory, comprising: a jump instruction detection unit for detecting jump instructions in the program and a jump destination instruction for each of the jump instruction; a division unit for dividing the program into basic blocks based on the jump instructions and the jump destination instructions detected by the jump instruction detection unit; a definition instruction extraction unit for extracting, once the program has been divided into basic blocks, one definition instruction at a time from a basic block; a corresponding reference instruction detection unit for detecting, once a definition instruction has been extracted, a reference instruction using a variable whose value is set by the definition instruction from the basic block including the definition instruction extracted by the definition instruction extraction unit; a definition instruction movement possibility judgement unit for judging, once the reference instruction has been detected, whether it is possible to move the definition instruction to a position of the reference instruction detected by the corresponding reference instruction detection unit; a definition instruction movement unit for moving, the definition instruction for which movement is judged by the definition instruction movement possibility judgement unit to be possible to a point just before the reference instruction corresponding to the definition instruction and for synthesizing the definition instruction and the reference instruction into one simple block; and simple block remaining instruction movement unit for moving, when the definition instruction moved by the definition instruction movement unit before movement is a final instruction in a simple block, every remaining instruction in a same simple block as the definition instruction moved by the definition instruction movement unit before movement to a point just before a movement destination of the definition instruction and for synthesizing every remaining instruction into a destination simple block; and a resource assignment unit for assigning, once the definition instruction extraction unit has extracted every definition instruction, all variables whose live ranges interfere with one another to different registers.

Also, the definition instruction movement possibility judgement unit may include: a variable singular/plural judgement unit for judging whether a variable whose value is set by the definition instruction extracted by the definition instruction extraction unit is singular; a reference singular/plural judgement unit for judging, when the variable singular/plural judgement unit judges that the variable is singular, whether there is only one reference instruction detected by the corresponding reference instruction detection unit; a first resetting validity judgement unit for judging, when the reference singular/plural judgement unit judges that there is only one reference instruction, whether the variable whose value is set in the definition instruction corresponding to the reference instruction is reset during a part of the program from the definition instruction to the reference instruction; a definition instruction used variable detection unit for detecting, when the first resetting validity judgement unit judges that there is no resetting, any variables used in the definition instruction; a second resetting validity judgement unit for judging whether any variables detected by the definition instruction used variable detection unit are reset during the part of the program from the definition instruction to the reference instruction; and a movement possibility judgement unit for judging, when the second resetting validity judgement unit judges that there is no resetting, that the definition instruction can be moved to a position of the reference instruction.

Also, the resource assignment unit may include: a live range detection unit for detecting, for every variable in the program, a live range which is a range for which a variable in the program is valid, and for expressing a detection result as a set of instruction position information showing positions of instructions included in the live range: a basic block internal live variable detection unit for detecting every variable for which the live range detected by the live range detection unit is positioned entirely within one of the basic blocks and for expressing a detection result as a basic block internal live variable group corresponded to an appropriate basic block; an inter-basic block live variable detection unit for detecting every variable for which the live range detected by the live range detection unit extends between basic blocks and for expressing a detection result as an inter-basic block live variable group; a first live range interference judgement device for taking two variables at a time from the inter-basic block live variable group and, by calculating an intersection set of sets of instruction position information corresponding to the live ranges of the two variables, for judging whether there is interference between the live ranges; a second live range interference judgement device for taking two variables at a time from a basic block internal live variable group corresponded to a same basic block and, by calculating an intersection set of sets of instruction position information corresponding to the live ranges of the two variables, for judging whether there is interference between the live ranges; and a third live range interference judgement device for taking one at a time variable from a basic block internal live variable group corresponded to a basic block and one variable at a time from the inter-basic block live variable group and, by calculating an intersection set of the sets of instruction position information corresponding to the live ranges of the two variables, for judging whether there is interference between the live ranges; and an assignment unit for assigning variables whose live ranges interfere with one another to different registers by using judgement results of the first, the second and the third live range interference judgement devices.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A is an example of a program divided into basic blocks;

FIG. 1B is a table showing the live ranges of every variable in the program shown in FIG. 1A;

FIG. 1C is a table showing for the variables which interfere with a given variable in the program;

FIGS. 5A–5G are a series of figures showing the procedure for the generation of simple blocks;

FIG. 14A is a figure for showing the expression of basic blocks in the judgement process;

FIG. 14B is a figure for showing the expression of basic blocks in the multi-directional branch process;

FIG. 14C is a figure for showing the concept of a live range;

FIG. 14D is a figure for showing the concept of a live range;

FIG. 15 is an example of a source program;

FIG. 16 is an example of an intermediate language program;

FIG. 17 is an example of an intermediate language program split into basic blocks;

FIG. 18A is an example of the data flow information;

FIG. 18B is an example of the definition/reference information;

FIG. 18C is an example of the reference/definition information;

FIG. 19 is a drawing showing the live ranges of all of the variables in the intermediate language program;

FIGS. 20A–20D are figures showing the procedure of the generation of the simple blocks;

FIG. 22A is a drawing showing an example of the stored contents of the live range storage unit 11;

FIG. 22B is a drawing showing an example of the stored contents of the simple block internal live range storage unit 12;

FIG. 22C is a drawing showing an example of the stored contents of the basic block internal live range storage unit 13;

FIG. 22D is a drawing showing an example of the stored contents of the inter-basic block live range group storage unit 14; and FIG. 23 is a drawing showing an investigation result of the live range interference investigation.

DESCRIPTION OF THE PREFERRED EMBODIMENT

Figure 2:
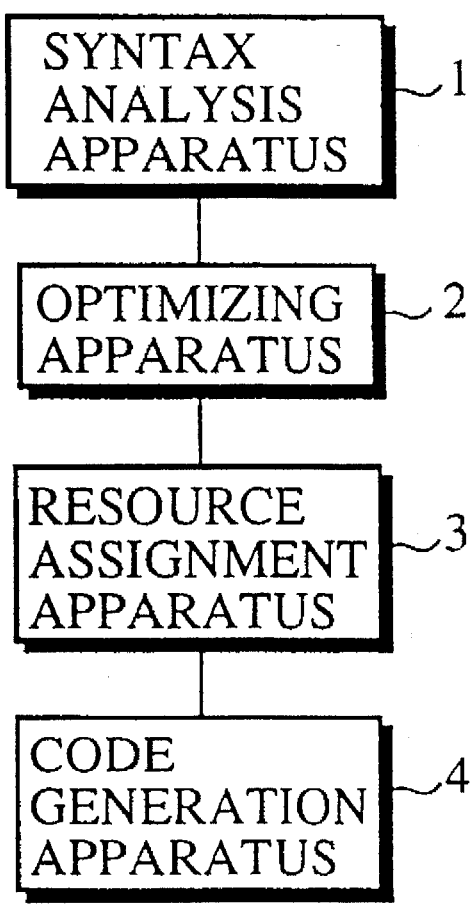
FIG. 2 is a construction of the compiler of the present invention.

The following is a description of the compiler of the embodiment of the present invention with reference to the drawings.

First, a definition of the terms to be used in this specification.

Basic block

A series of consecutive instructions in a program, with no jumps from the series, or into the series during execution. Examples of basic blocks are shown in FIG. 17. Since in this embodiment it is an intermediate language program that is to be processed, this series of instructions is given in an intermediate language.

Next, the following is an explanation of basic blocks in a judging process or in a multi-directional branching process, with reference to FIG. 14A and FIG. 14B.

As shown in FIG. 14A, since basic blocks are defined as having no jumps from the series of instructions, or into the series once underway, it can be seen that the line "if (p)", which resembles C language, refers to a judgement process, so that the processes S1 and S2 which are executed alternatively after this judgement become the basic blocks B1 and B2, respectively. Basic blocks such as B1, B2 which equate to processes S1, S2 are known as branch basic blocks.

Next, as shown in FIG. 14B, during the multidirectional branch operation given as the line "switch (p)", which also resembles C language, processes S1, S2, S3, S4, . . . are executed alternatively, and hence become the basic blocks B1, B2, B3 and B4, respectively.

Here, one sentence or one intermediate code instruction, which is the unit for execution of the intermediate language program, is called one intermediate language step.

Definition/Reference of a Variable

An intermediate language step which sets the value of a variable is called the definition, while an intermediate language step which uses the set value of a variable is called a reference. Also, the word "definition" refers to the action of setting a value to a variable, while the word "reference" refers to the use of a set value of a variable.

Information regarding the Live Range

Regardless of whether in a source program or in an intermediate code program, the intervals between steps in the program are referred to as points, with a variable being said to be live at a point if there is a valid value stored in the variable at that point. Additionally, the group of variables which are live at the entry point into a basic block B are expressed as LiveIn[B], while the group of variables which are live at the exit point from basic block B are expressed as LiveOut[B]. Also, the group of variables which are defined during basic block B are expressed as Def[B]. FIG. 18A shows the groups LiveIn[B] and LiveOut[B] for the example program shown in FIG. 17, with in this drawing showing that the variables [p1, p2, p3] are live at the entry point into basic block[B1], while variables [z, a, b] are live at the exit point of basic block[B1].

Definition-reference information, Reference-definition information

Definition-reference information is the information which shows for a variable where a set value set at a given definition is used, with FIG. 18B showing an example of such (the use of a set value of a variable set at definition is referred to as an arrival at reference for a definition). For the example of FIG. 18B, it can be seen that the variable t1 defined at the intermediate language step s1 is refer to in intermediate language step s2.

Reference-definition information is the information which shows for a variable when a set value being used during reference was defined, with FIG. 18C showing an example of such. For the example of FIG. 18C, it can be seen that of the variables t1, p3 referenced during intermediate language step s2, variable t1 was defined in intermediate language step s1.

Note about variables

Among the variables, there are some which have a plurality of live ranges. In this case, they can be assigned to different registers for each live range, with such arrangement being better for the object program. In order to do so, when there are a number of live ranges, the compiler treats each live range as a separate variable. The following is an explanation of this process with reference to FIG. 14C. In FIG. 14C, the variable x which is defined as [x=10] is referenced in [y=x+5], so that the live range of the variable x which is defined as [x=10] is shown in the figure as L5. On the other hand, the variable x which is defined as [x=20] is referenced in [y=x+30], so that the live range of the variable x which is defined as [x=20] is shown in the figure as L6.

Conversely, in FIG. 14D, the variable x which is defined as [x=40] is not referenced before being redefined as [x=30], so that the live range for the variable x which is defined as [x=40] does not exist. That is because it is judged that the variable x which is defined as [x=40] does not exist. Since the variable x which is defined as [x=30] is referenced during [y=x+50], the live range of the variable x which is defined as [x=30] is shown as L7.

Note about live ranges

Live ranges are shown for groups of basic blocks and for groups of intermediate language steps. The following reference has been cited below so as to render unnecessary any detailed description in this embodiment. Also, in judging by means of the intersection set whether there is interference of live ranges or not, live ranges whose starting and ending points coincide in the same intermediate language step are not judged as interfering. In order to do so, when the live range of a variable is expressed in groups of steps, the intermediate language step in which the variable is defined is not included in the group.

The following reference includes a detailed description of the information relating to variables and live ranges, the definition-reference information, and the reference-definition information.

A. Aho, R. Sethi, J. Ullman

"Compilers Principles, Techniques, and Tools" Addison Wesley, 1988

[Compiler Construction]

The following is an explanation of the construction of the compiler of the present invention with reference to FIG. 2. As shown in the drawing, it is comprised of a syntax analysis apparatus 1, an optimizing apparatus 2, a resource assignment apparatus 3, and a code generation apparatus 4.

The syntax analysis apparatus 1 executes the lexical analysis, the syntax analysis and the meaning analysis for the source program which is stored as a file, and outputs an intermediate language program as the result of its analysis. FIG. 15 shows one example of a source program, with an example of an intermediate language program corresponding to the source program being shown in FIG. 16.

The optimizing apparatus 2 executes the optimizing of the intermediate language program with the object of minimizing the program size and the process execution time of the finally generated machine language program.

The resource assignment apparatus 3 finds the live ranges of the variables in the program and assigns the resources, consisting of registers and memory, to each live range of the variables.

The code generation apparatus 4 converts the optimized intermediate language program into a set of machine language instructions for the target machine in accordance with the assignment result of the resource assignment apparatus 3, which it then outputs as the object program.

[Construction of the Optimizing Apparatus 2]

Figure 3:
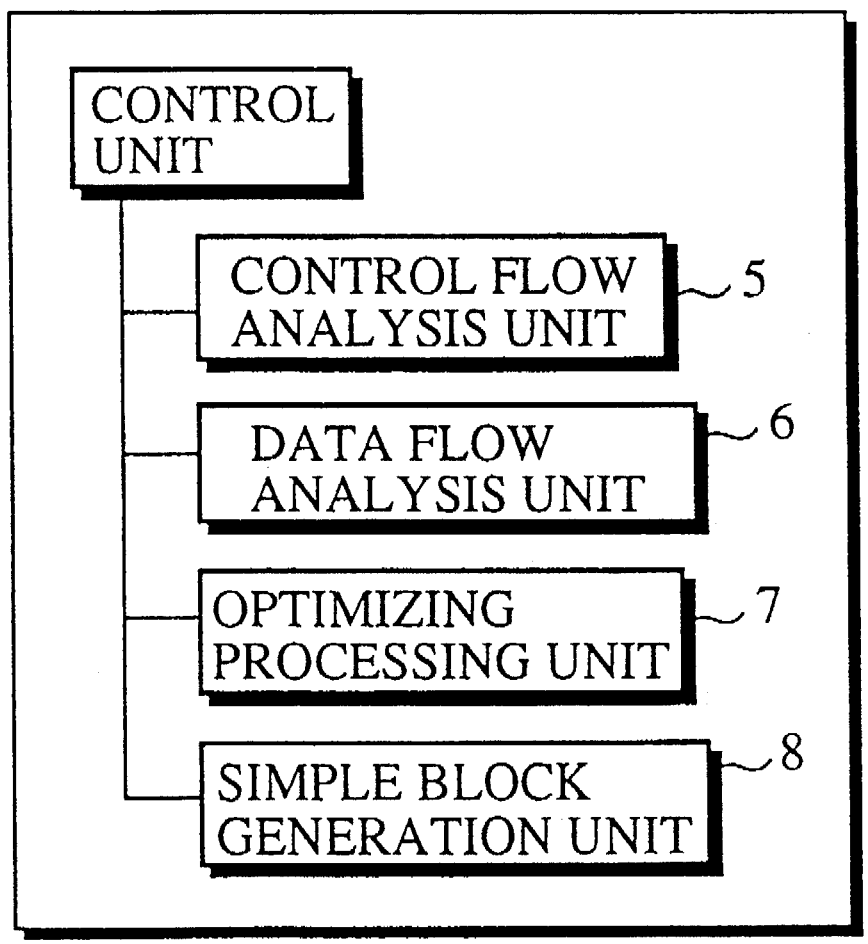
FIG. 3 is a construction of the optimizing apparatus 2.

FIG. 3 shows the construction of the optimizing apparatus 2 shown in FIG. 2. Since the details of the optimizing process of the optimizing apparatus 2 do not constitute the main gist of the present invention, an explanation of such has been omitted and only the aspects in which the operation relates to the compiler of the present invention will be explained.

The optimizing apparatus 2 is comprised of a control flow analysis unit 5, a data flow analysis unit 6, an optimizing processing unit 7, and a simple block generation unit 8. The control flow analysis unit 5 and the data flow analysis unit 6 execute such operations as the basic block conversion, the control flow analysis, and the data flow analysis. Basic block conversion is the dividing of the program into basic blocks which are the units for which the processing of the program is to be executed. The basic blocks for the example program shown in FIG. 16 are shown in FIG. 17. Control flow analysis is the analysis of the control flow between every basic block, while data flow analysis analyses where each variable was defined and where each variable was referenced within each separate block. By means of these processes, the data flow information, the definition-reference information, and the reference-definition information are obtained. Examples of these three kinds of information are shown in FIG. 18A, 18B and 18C, corresponding to the intermediate language program shown in FIG. 17.

In the data flow information shown in FIG. 18A, it can be seen that variables p1, p2, p3 are live at the entry point into basic block B1. In the same way, it can be seen that variables z, a, b are live at the exit point of basic block B1. In FIG. 18B, it can be seen that the variable t1 defined in intermediate language step s1 is referenced in intermediate language step s2. In the reference-definition information shown in FIG. 18C, the variable t1 referenced in intermediate language step s2 can be seen to have been defined in intermediate language step s1.

The optimizing processing unit 7 executes the optimizing of the intermediate language program using the processing result of the control flow analysis unit 5 and the data flow analysis unit 6. Since this does not constitute the main gist of the present invention, an explanation of such has been omitted.

Figure 21:
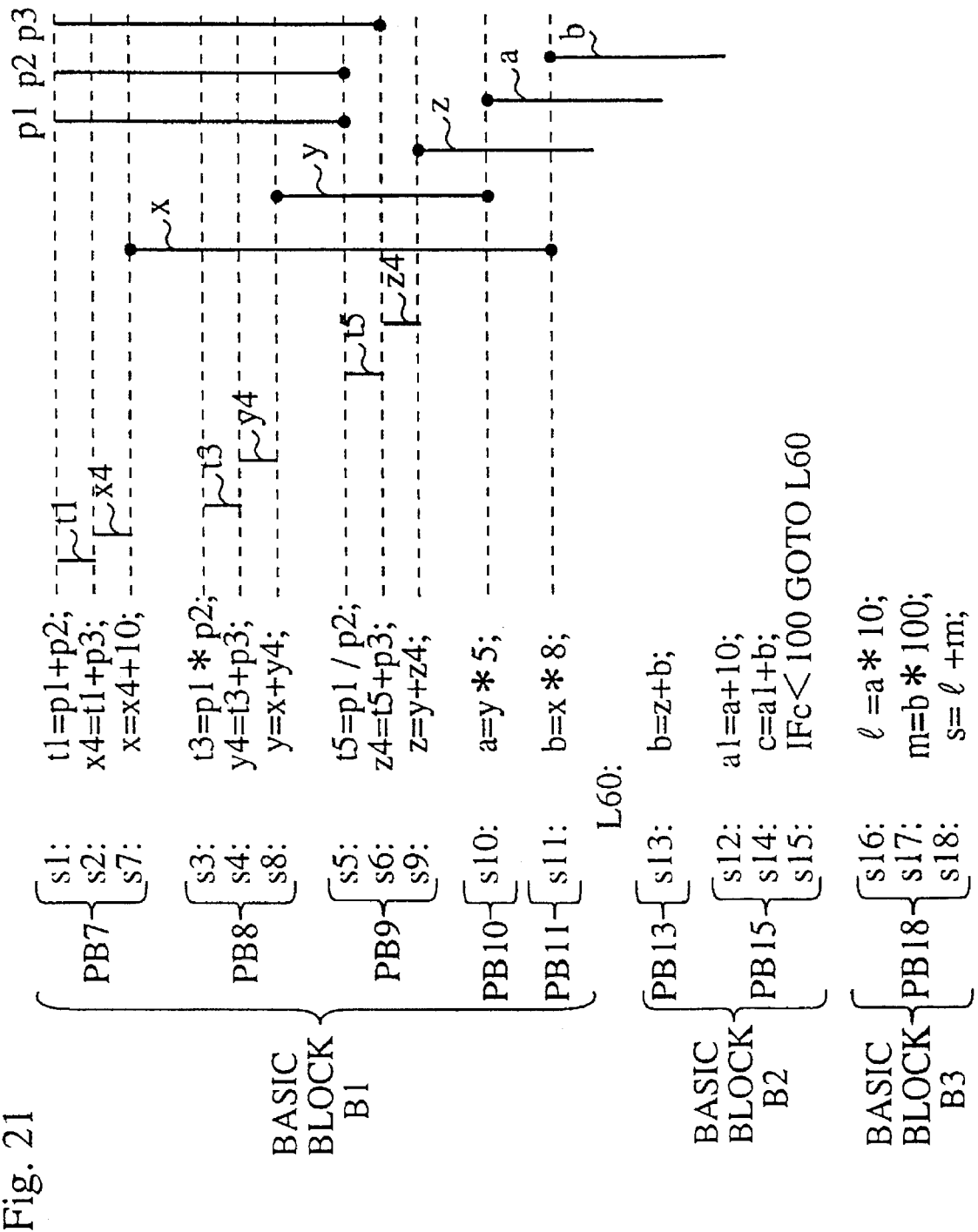
FIG. 21 is a drawing showing the live ranges of all of the variables after the generation of the simple blocks.

The simple block generation unit 8 divides each basic block into a number of small blocks and, after division, judges whether synthesis of pairs of small blocks is possible, synthesizing the small blocks when it is determined possible so as to form series of steps in which at least one pair of a definition and a reference are arranged in order. By executing this synthesis, the simple block generation unit 8 simplifies the interference between of the live ranges in each basic block, with the small blocks which are finally formed by this synthesis process being called simple blocks. The interference of the live ranges before the generation of these simple blocks is shown in FIG. 19, while the interference of the live ranges after generation is shown in FIG. 21. As can be seen by comparing the two figures, the interference of the live ranges is simpler in FIG. 21, with less interference between the live ranges, so that the number of registers needed by the resource assignment apparatus 3 can be reduced.

Figure 4:
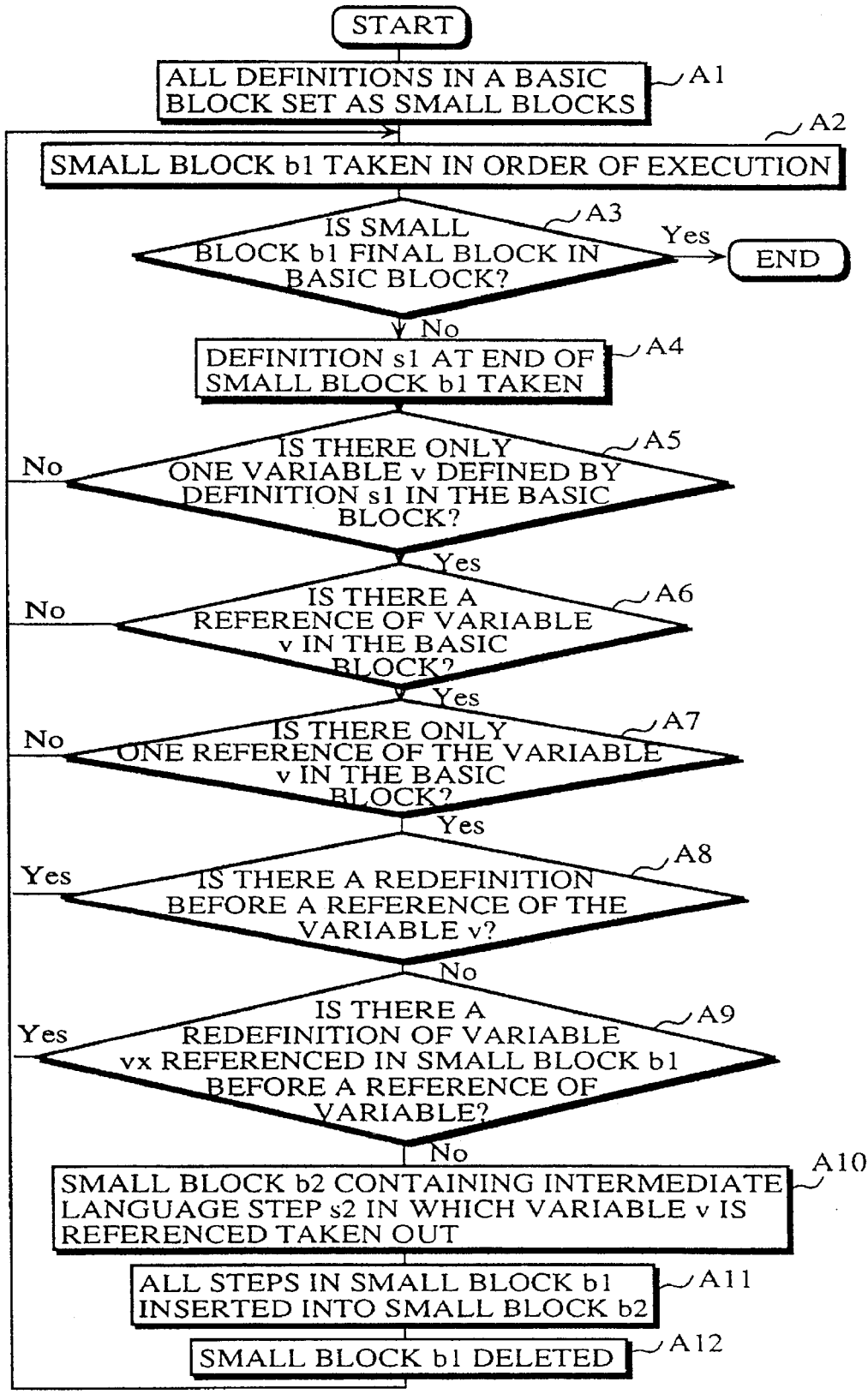
FIG. 4 is a flowchart for the simple block generation process.

The following in an explanation of the processing procedure of the simple block generation unit 8 with reference to the flowchart in FIG. 4 and the drawings FIGS. 5A through 5G. FIG. 4 is a flowchart showing the process of the generation of the simple blocks while FIGS. 5A through 5G are drawings which visually represent processes in the steps shown in FIG. 4. In FIG. 5, the vertical lines whose top and bottom are marked by a black circle "·" or by a wavy line "~" represent the live ranges, with the wavy line "~" showing that the live range of this variable carries over into an adjacent basic block. The vertical lines whose top end and bottom end are marked by a white circle "o" show the basic blocks. Also, a black circle "·" with the added character string "Def" shows a definition of a variable, while a black circle "·" with the added character string "Ref" shows a reference of a variable.

Figures 20A, 20B, 20C, 20D:
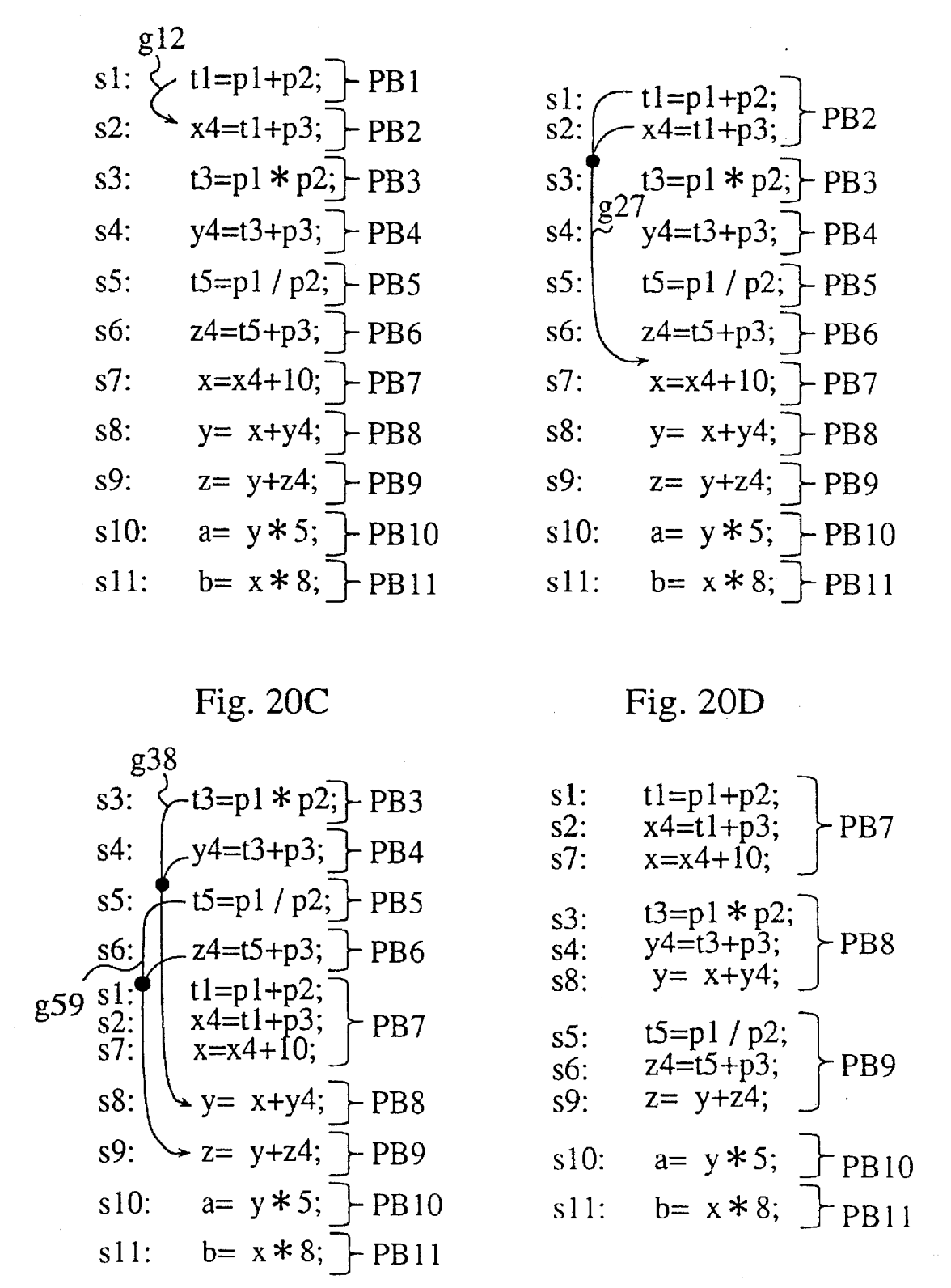

In Step A1, the simple block generation unit 8 sets each intermediate language step in the source program as a small block. For the example of the basic block B1 shown in FIG. 19, the contents of the basic block B1 will become as shown in FIG. 20A. As shown in FIG. 20A, the intermediate language step s1 is set as the small block PB1. In the same way, the intermediate language step s2 is set as the small block PB2, and the intermediate language steps s3, s4, s5 . . . are set as the small blocks PB3, PB4, PB5 . . .

In Step A2, the simple block generation unit 8 retrieves each small block one at a time in order of execution.

In Step A3, the simple block generation unit 8 judges whether the retrieved small block b1 is the final small block in the basic block, ending the processing if it is the last, or executing Step A4 if it is not.

In Step A4, the simple block generation unit 8 retrieves the intermediate language step s1 which is the final step in small block b1.

In Step A5, the simple block generation unit 8, as shown in FIG. 5B, judges whether there is a just one, or whether there are a number of variables v defined in the retrieved intermediate language step s1, returning to Step A2 if there are a number, or advancing to Step A6 if there is just one.

The processing content of Step A5 is shown in FIG. 5A. In this figure, there is a black circle "·" with a question mark "?" level with the position s1 where the variable v is defined, with this black circle "·" with a question mark "?" showing another definition at position s1. In Step A5, it is verified that there is no other definition at position s1, such as this definition with the question mark "?".

In Step A6, the simple block generation unit 8 judges whether all of the references of variable v are in the same basic block, as is shown in FIG. 5B, which is to say whether the length of the live range reaches into another basic block. If the range reaches into another block, then the process returns to Step A2, while if it does not, the process advances to Step A7.

The processing content of Step A6 is shown in FIG. 5B. In this figure, there is a black circle "·" with a question mark "?" below the position s1 where the variable v is defined, with this black circle "·" with a question mark "?" showing a reference of the variable v during the basic block. In Step A6 it is verified whether there are any references in the basic block, such as that shown by the reference marked by the question mark "?".

In Step A7, the simple block generation unit 8 judges whether there is only one reference of variable v. This judgement is executed by investigating the number of references of variable v in the definition-reference information. If there are a number of references, the process returns to A2, while if there is only one reference, the process advances to Step A8.

The processing content of Step A7 is shown in FIG. 5C. In this figure, there is a question mark "?" next to the black circle "·" aside from the reference also marked with a black circle "·", with this question mark "?" reference showing another reference of the variable v. During Step A7 it is checked that there are not a plurality of references for the variable v in the basic block, such as that shown by the reference marked by the question mark "?".

In Step A8, the simple block generation unit 8 judges whether the variable v, once defined at s1, is redefined before being referenced. If it is judged as being redefined, then the process returns to Step A2, while if it is not redefined, the process advances to Step A9.

The processing content of Step A8 is shown in FIG. 5D. In this figure, there are two vertical lines representing the variable v, and among these, one has the definition marked by the question mark "?" which shows the redefinition of the variable v which was originally defined at position s1. During Step A8, it is verified that there is no redefinition of the variable v defined at position s1 in the basic block, such as that shown by the definition marked by the question mark "?".

In Step A9, the simple block generation unit 8 judges whether the variable vx on which variable v depends (that is to say, the variable referenced in the small block b1) is redefined before the variable v defined at position s1 is referenced. If it is redefined, then the process returns to Step A2, while if it is not redefined, the process advances to Step A10. Here, all variables which can be influenced by the set value of said variable are referenced to are dependent variables. For example, since in FIG. 22D the set value of the variable x shown in small block PB7 is influenced by the set values of x4, t1, p3, p1 and p2, then variable x is said to depend on the variables x4, t1, p3, p1 and p2. If the variables on which variable x depends are redefined between the definition of x and a reference of x, then the moving of the definition instruction of x to the position of the reference position will result in the breakdown of the above dependent relation. The simple block generation unit 8 considers whether such dependent relations will be lost in judging whether or not to move an instruction.

The processing content of Step A9 is shown in FIG. 5E. In this figure, there is a reference which is level with position s1, but this shows that the live range for variable vx is terminated at this reference point. Also, below the reference point, there is a definition "Def" marked with a question mark "?", with this showing that the variable vx is redefined during the live range of the variable v defined at point s1. In Step A9, it is verified that there is no redefinition like this during the basic block.

During Steps A10, A11, and A12, the simple block generation unit 8 removes the small block b1, and, as shown in FIGS. 5F and 5G, inserts the removed small block b1 at the head of the small block b2 (intermediate language step s2) during which a reference to variable v in made (here, small block b1 may alternatively be inserted into just before Step s2). These removal and insertion processes may synthesize small blocks b1 and b2 into one small block. After such synthesis is executed, the simple block generation unit 8 deletes the small block b1. For the example shown in FIG. 20A, the small block PB1 is removed, and is then inserted just before small block PB2, with the two blocks then being synthesized to form the new small block PB2 shown in FIG. 20A (as shown by the arrow g12). The synthesized block PB2 created as a result can be seen in FIG. 20B to include the content of intermediate language steps s1 and s2. Then, as shown in FIG. 20B, small block is removed and is inserted just before small block PB7, with small blocks PB2, PB7 then being synthesized. The synthesized block PB7 created as a result can be seen in FIG. 20C to include the content of intermediate language steps s1, s2 and s7. In the same way, small blocks PB3, PB4 and PB8 are synthesized as shown by arrow g38, while small blocks PB5, PB6 and PB9 are synthesized as shown by arrow g59, so that small block PB8 includes the content of intermediate language steps s3, s4 and s8, and small block PB9 includes the content of intermediate language steps s5, s6 and s9. By means of the above syntheses, small blocks PB7, PB8 and PB9 become simple blocks.

The process from Step A1 to A12 described above is repeated by the simple block generation unit 8 for all of the remaining small blocks. In the generated simple blocks, the intermediate language steps are set so that from the start of the block to the penultimate step there will only be one reference of the variable. Also, the intermediate language step in which the variable is referenced is set so as to be in the same simple block as the intermediate language step in which the variable is defined.

[Internal Construction of the Resource Assignment Apparatus 3]

Figure 6:
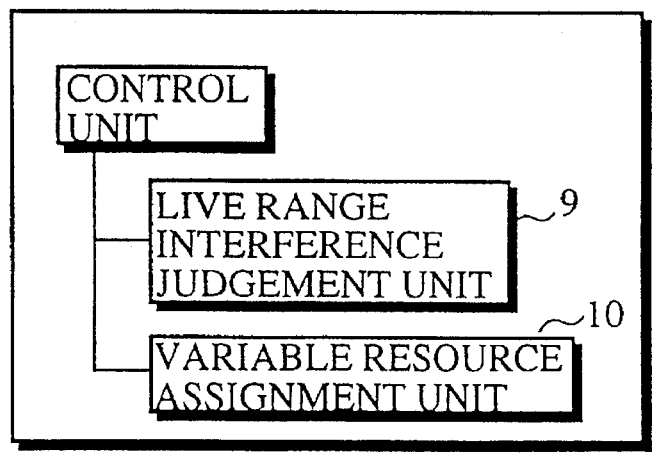
FIG. 6 is a figure showing the construction of the resource assignment apparatus 3.

FIG. 6 is a figure showing the construction of the resource assignment apparatus 3 shown in FIG. 1. As shown in FIG.

6, the resource assignment apparatus 3 includes a live range interference judgement unit 9 and a variable resource assignment unit 10.

The live range interference judgement unit 9 generates the live ranges and detects interference between the live ranges.

The variable resource assignment unit 10 uses the information relating to live ranges found by the live range interference judgement unit 9 and assigns the variables to the resources which include registers and memory. In doing so, it assigns variables to different registers or to the memory when there is interference between variables.

[Internal Construction of the Live Range Interference Judgement Unit 9]

Figure 7:
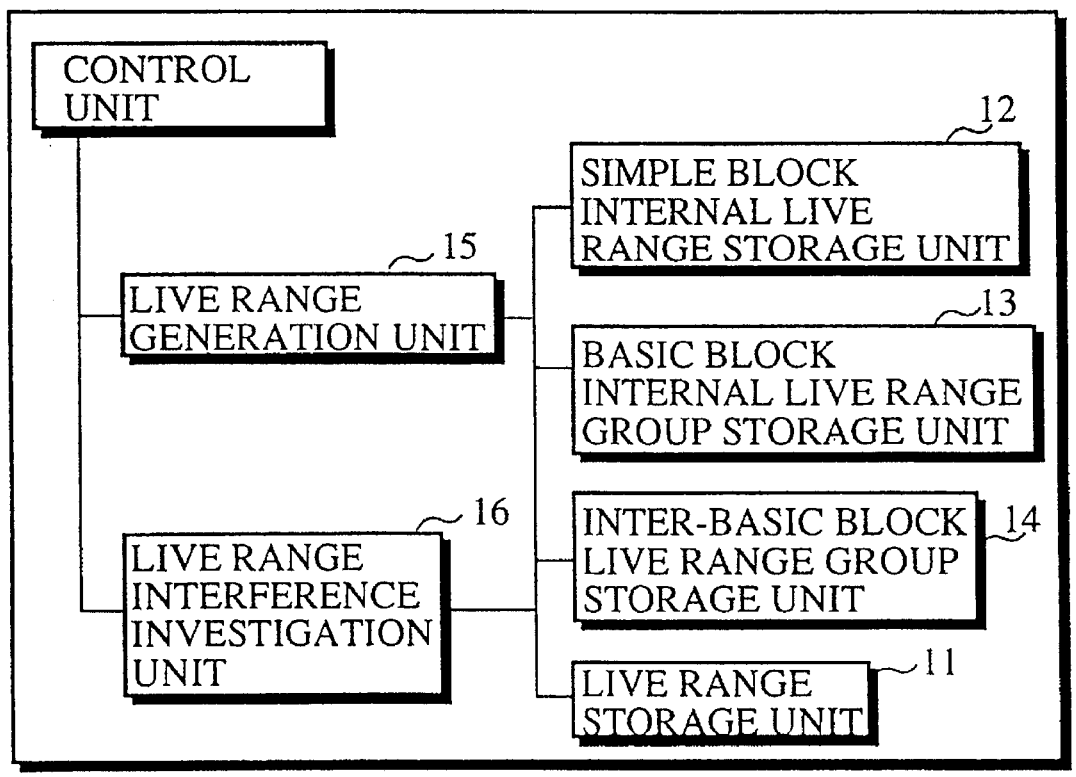
FIG. 7 is a figure showing the construction of the live range interference judgement unit 9.

FIG. 7 is a figure showing the construction of the live range interference judgement unit 9 shown in FIG. 6.

The live range interference judgement unit 9 can be seen to be comprised of a live range storage unit 11, a simple block internal live range storage unit 12, a basic block internal live range storage unit 13, an inter-basic block live range group storage unit 14, a live range generation unit 15, and a live range interference investigation unit 16.

The live range storage unit 11 stores the live ranges expressed in terms of intermediate language steps corresponded with the variables they represent. It also stores information corresponding each of the variables with the simple blocks in which it appears and the basic blocks in which it appears. FIG. 22A shows an example of the stored content of the live range storage unit 11. This is corresponded to the example program shown in FIG. 21. By referring to this figure, it can be seen that the live range of the variable t1 is only present in intermediate language step s2, so that variable t1 only belongs to simple block PB7 and to basic block B1.

The simple block internal live range storage unit 12 stores only the variables whose live ranges exist completely within one simple block, corresponded with the simple block which contains them. Groups of such variables whose live ranges are held completely within one simple block are called the simple block internal variable groups. FIG. 22B shows an example of the stored content of the simple block internal live range storage unit 12. This is again corresponded to the example program shown in FIG. 21. By reference to this table, it can be seen that simple block PB7 includes the variables t1 and x4.

The basic block internal live range storage unit 13 stores only the variables whose live ranges exist only in one basic block but which extend across a plurality of simple blocks, corresponded with the basic block to which they belong. The groups of variables stored by the basic block internal live range storage unit 13 are called the basic block internal variable groups. FIG. 22C shows an example of the stored content of the basic block internal live range storage unit 13. This is again corresponded to the example program shown in FIG. 21. By reference to this table, it can be seen that the basic block internal variable group for basic block B1 includes the variables x and y.

The inter-basic block live range group storage unit 14 stores variables whose live ranges extend over a plurality of basic blocks. The group of variables stored by the inter-basic block live range group storage unit 14 is called the inter-basic block variable group. FIG. 22D shows an example of the stored content of the inter-basic block live range group storage unit 14. This is again corresponded to the example program shown in FIG. 21. By reference to this table, it can be seen that the live ranges of the variables z, a, and b all extend over a plurality of basic blocks.

The live range generation unit 15 expresses the live ranges of the variables as groups of intermediate language steps and, depending on the range of the live ranges, classifies the variables into the 3 kinds of groups. The processes executed by the live range generation unit 15 can be classified into a live range generation process, a live range per definition detection process, and a succeeding block live range detection process, with the above 3 kinds of groups being the previously noted simple block internal variable group, basic block internal variable group, and inter-basic block variable group. These classifications decide where variables are to be stored, whether in the simple block internal live range storage unit 12, in the basic block internal live range storage unit 13, or in the inter-basic block live range group storage unit 14.

The following is an explanation of the operational procedure of the live range generation unit 15 with reference to FIGS. 8, 9, 10 and 11.

Figure 8:
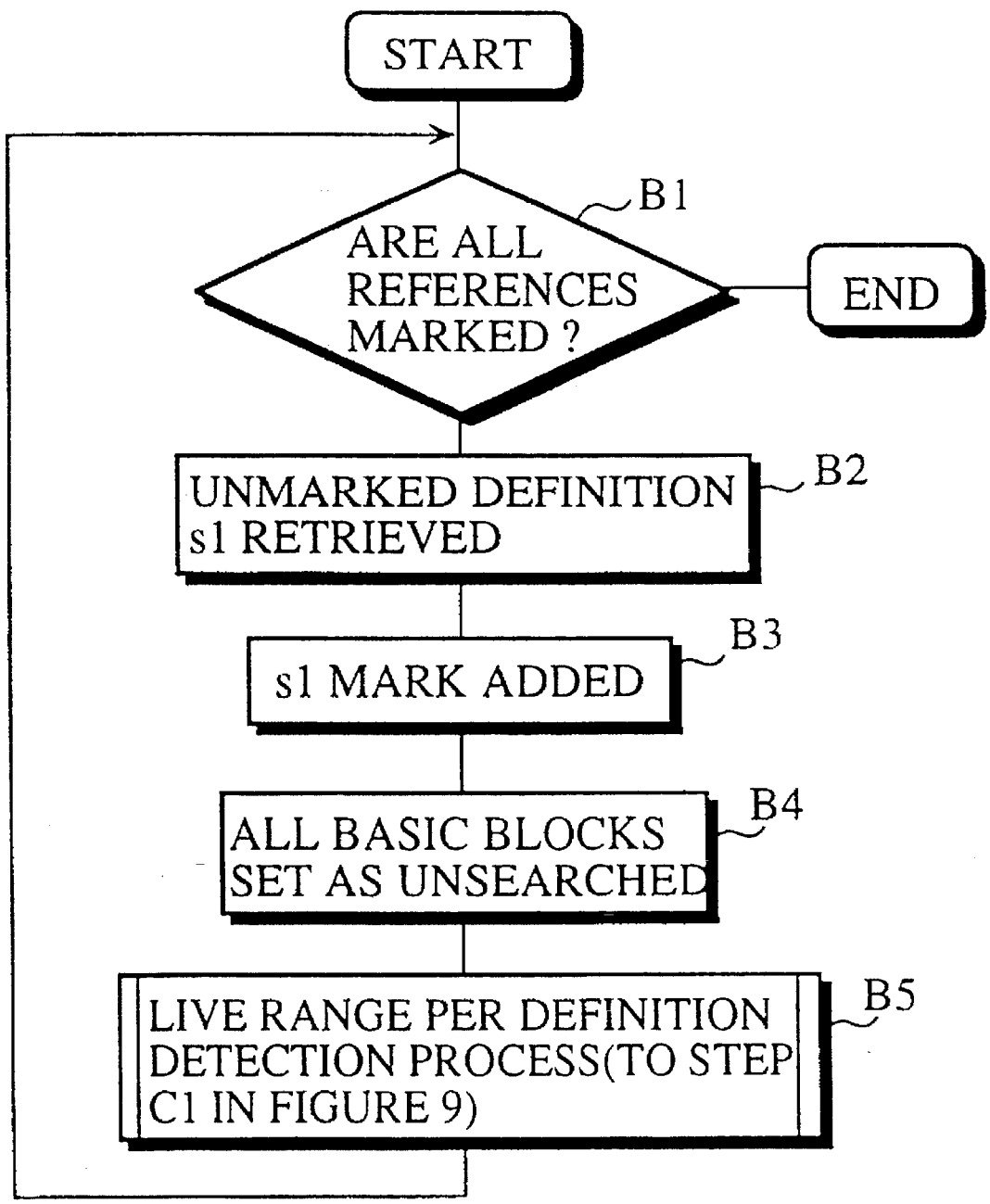
FIG. 8 is a flowchart for the live range generation process.
Figure 9:
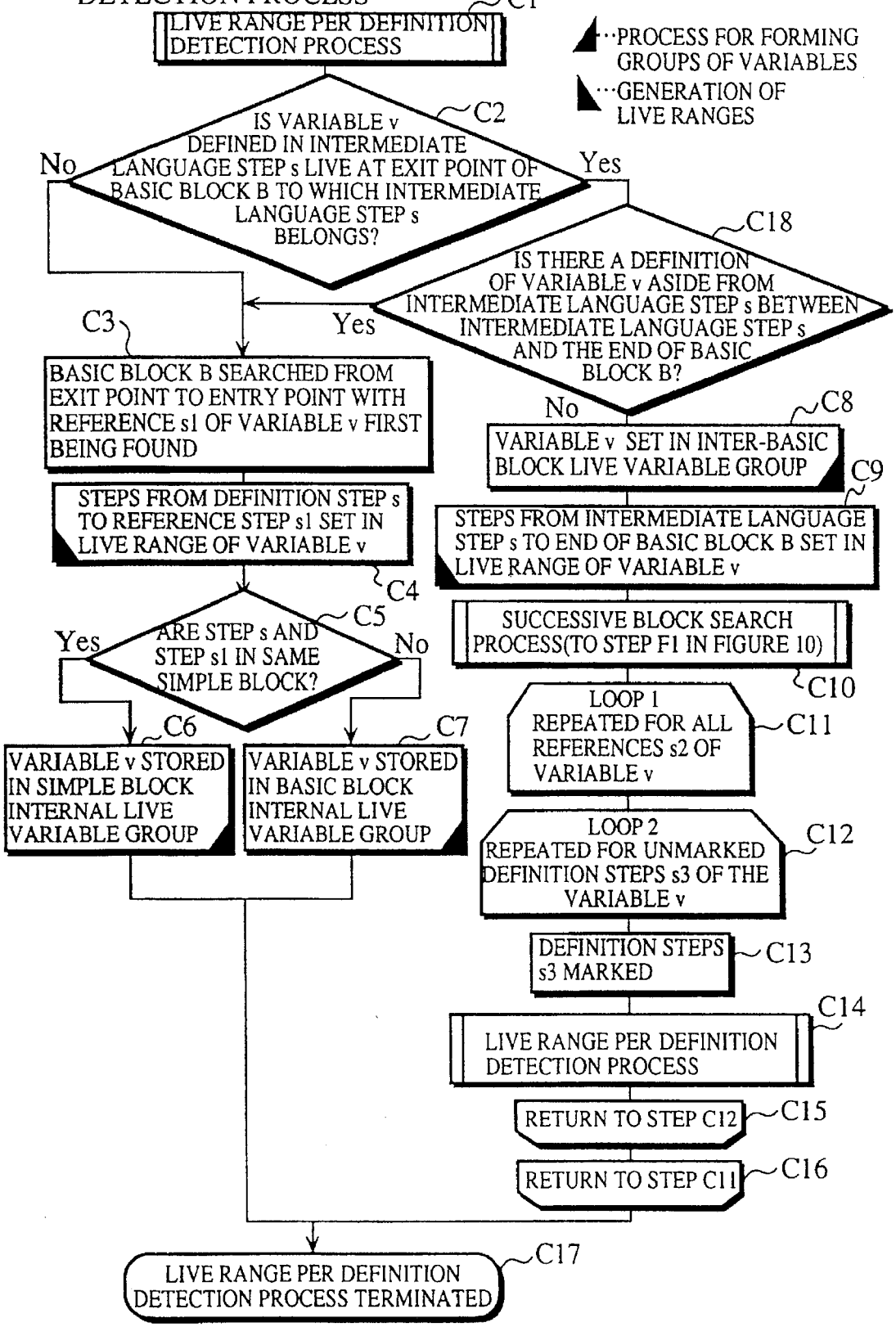
FIG. 9 is a flowchart for the live range per definition detection process.
Figure 10:
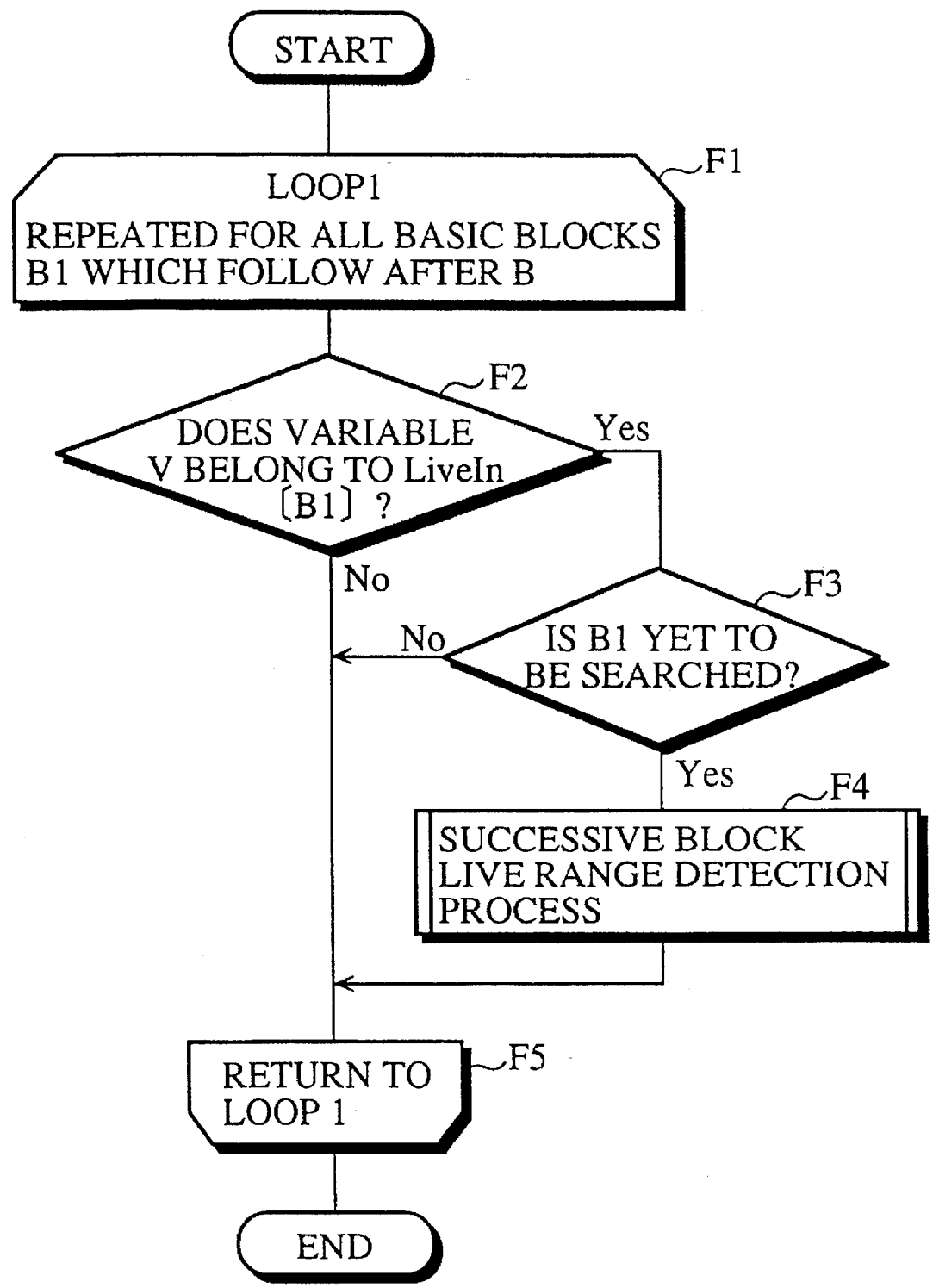
FIG. 10 is a flowchart for the successive block search process.
Figure 11:
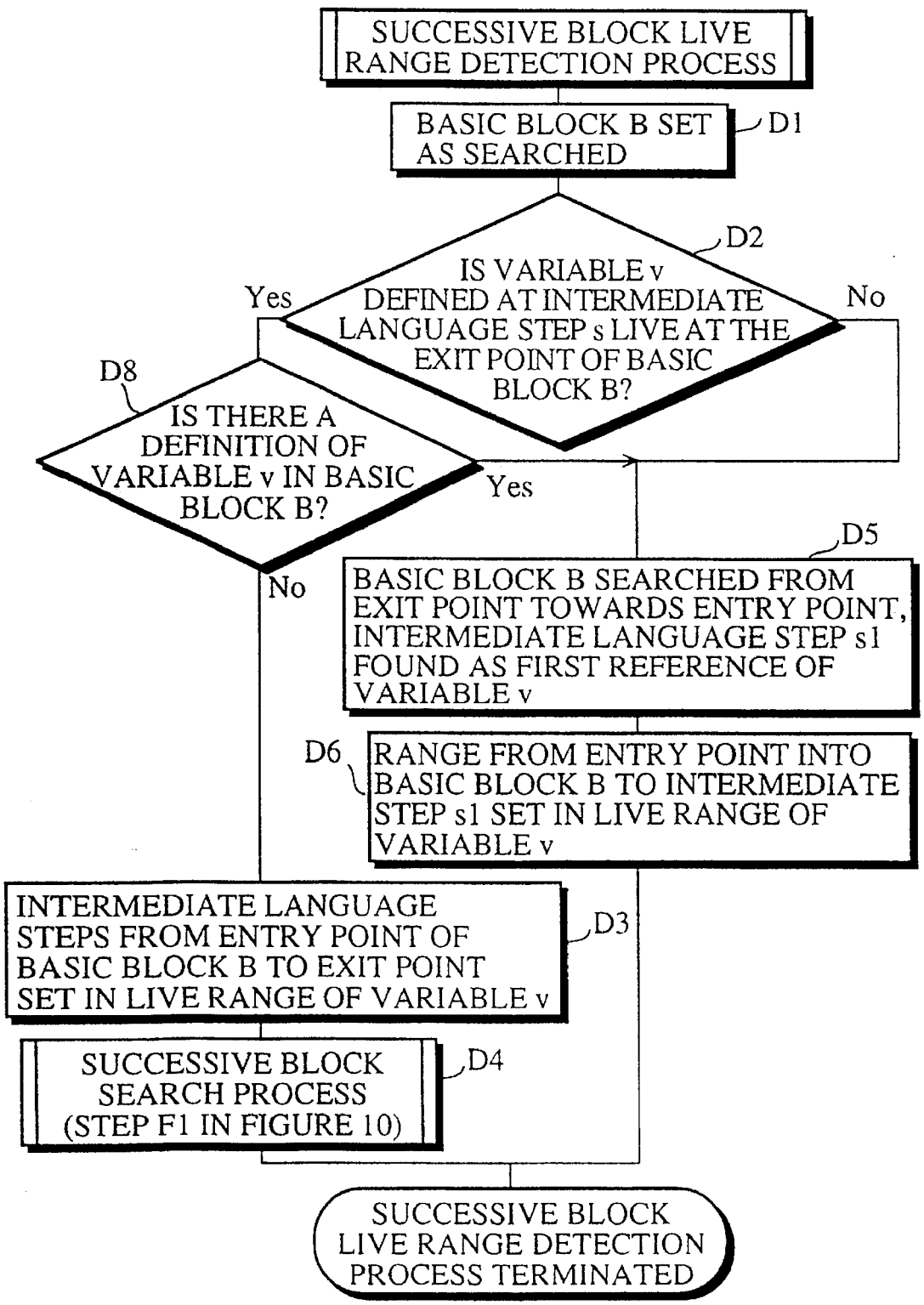
FIG. 11 is a flowchart for the successive block live range detection process.

FIG. 8 is a flowchart for the live range generation process, FIG. 9 is a flowchart for the live range per definition detection process, FIG. 10 is a flowchart for the successive block search process, and FIG. 11 is a flowchart for the successive block live range detection process.

In Step B1 in FIG. 8, the live range generation unit 15 judges whether there are definitions which are yet to be processed. The judgement of whether a definition has been processed or is yet to be processed is based whether the definition has been marked. If there is such an unprocessed definition, the live range generation unit 15 executes Step B2, while if there is not, it terminates the process.

During Steps B2, B3, B4 and B5, the live range generation unit 15 retrieves a definition s1 which is unmarked, marks the definition s1 and then sets every basic block as unsearched, before executing the live range per definition detection process.

The processing in Steps B1, B2, B3, B4 and B5 is then repeated until all of the definitions have been marked.

In Step C2 shown in FIG. 9, the live range generation unit 15 determines whether the variable v defined at intermediate language step s is live at the exit point of basic block B, or, in other words, whether the variable v belongs to the group LiveOut[B], executing Step C18 if it does belong to the group LiveOut[B], or executing Steps C3 through C7 if it does not.

In Step C18, the live range generation unit 15 judges whether there are no definitions, aside from definition s, of the variable v in basic block B from the intermediate language step following definition s to the end of the basic block B. If there are no definitions, then the live range generation unit 15 executes Steps C8 through C16, while if there are definitions, then the live range generation unit 15 executes Steps C3 through C7.

In Steps C3, C4, the live range generation unit 15 searches the basic block B in the direction from its exit point to its entry point, in doing so finding the reference s1 of variable v. This search operation is executed by referring to the definition-reference information for definition s. On finding the reference s1, the live range generation unit 15 stores the intermediate language steps from the intermediate language step following definition s to reference s1 in the live range storage unit 11 as the live range of the variable v.

In Steps C5, C6 and C7, the live range generation unit 15 judges whether the simple block pb to which definition s belongs is the same as the simple block to which reference s1 belongs, storing the variable v in the simple block internal live range storage unit 12 (Step C6) when they are in the same simple block (Step C5:Yes), while, on the other hand, when the simple block to which reference s1 belongs is not the same as the simple block pb to which definition s belongs (Step C5:No), the live range generation unit 15 stores the variable v in the basic block internal live range storage unit 13 (Step C7), before advancing to Step C17.

In Steps C8, C9, the live range generation unit 15 stores the variable v in the inter-basic block live range group storage unit 14 (Step C8), and stores the intermediate language steps from the intermediate language step following definition s to the final intermediate language step in the basic block B in the live range storage unit 11 as the live range of the variable v (Step C9). However, when definition s is the final intermediate language step in the basic block B, nothing is stored in the live range storage unit 11.

In Step C10, the live range generation unit 15 retrieves the basic block which is to be executed after the basic block B (the successive basic block), and by referring to LiveIn[B1] for the successive basic block B1, verifies that the successive block B1 is yet to be searched and that the variable v is live at the entry point into successive basic block B1. After verification, the live range generation unit 15 sets definition s and basic block B1 to be processed, and executes the successive block search process.

FIG. 10 is a flowchart for the successive block search process.

In Steps F1, F2, F3, F4, and F5, the live range generation unit 15 judges whether variable v belongs to LiveIn[B1] (Step F2) and, when it does belong, then judges whether the basic block B1 to which it belongs is unsearched (Step F3). If it is unsearched (Step F3:Yes), then the live range generation unit 15 executes the successive block live range detection process (Step F4). If it is not unsearched (Step F3:No), then it repeats the above processes (Steps F1, F5) until it finds an unsearched successive basic block B1 for basic block B (Step F3:Yes).

FIG. 11 is a flowchart for the procedure of the successive block live range detection process.

In Step D1, the live range generation unit 15 sets basic block B as searched.

In Step D2, the live range generation unit 15 determines whether the variable v defined at intermediate language step s is live at the exit point of basic block B. If it is live (Step D2:Yes), then the live range generation unit 15 executes Step D8, while if it is not (Step D2:No), the live range generation unit 15 executes Steps D5 and D6. More specifically, the live range generation unit 15 performs the above judgement by verifying whether the variable v belongs to the group LiveOut[B].

In Step D8, the live range generation unit 15 judges whether there is no definition of the variable v in the basic block B, executing Steps D3 and D4 if there is no definition (Step D8:No), or executing D5 and D6 if there is (Step D8:Yes). More specifically, the live range generation unit 15 performs the above judgement by verifying whether the variable v belongs to the group Def[B].

In Step D3, the live range generation unit 15 sets the intermediate language steps from the entry point to the exit point of basic block B as the live range of the variable v.

In Step D4, the live range generation unit 15 executes the successive block search process.

In Step D5, the live range generation unit 15 searches the basic block B from the exit point to the entry point based on the definition-reference information for definition s, in doing so finding the reference s1 for variable v.

In Step D6, the live range generation unit 15 stores the intermediate language steps from the start of basic block B to reference s1 as the live range of the variable v in the live range storage unit 11, and terminates the successive block live range detection process shown in FIG. 11.

In the loop process of Steps C12, C13, and C14 in FIG. 9, the live range generation unit 15 recursively executes the live range generation process for the definition s3 which constitutes all of the remaining definitions on arriving at reference s2, adding the information for the live range relating to definition s3 to the live range for the variable v. This locating of the definition s3 is executed by referring to the reference-definition information for the reference s2. The above definition s3 is in said branch basic block and in order to execute a complete search of such, the live range generation unit 15 repeats the processes in C12, C13 and C14.

In Steps C11, C15, and C16, if there is a conditional branch process or a multi-directional branch process, and said reference s2 appears in only one branch basic block, then the live range generation unit 15 finds all of the remaining references in the remaining branch basic blocks. The loop processes of C12, C13 and C14 are then repeated for each of the references s2.

In Step C17, the live range generation unit 15 terminates the live range per definition detection process.

By means of the above process, variables are stored in one of the simple block internal live range storage unit 12, the basic block internal live range storage unit 13 and the inter-basic block live range group storage unit 14, with the stored contents of these storages units being shown in FIGS. 22B, 22C, and 22D.

The live range interference investigation unit 16 investigates whether there is interference between the live ranges of the variables. This investigation is performed with reference to the information stored in the simple block internal live range storage unit 12, the basic block internal live range storage unit 13, the inter-basic block live range group storage unit 14 and the live range storage unit 11. The following is an explanation of this interference investigation process, with reference to the flowchart in FIG. 12 and the drawings in FIGS. 13A through 13F.

In FIGS. 13A through 13F, vertical lines with black marks "." at each end represent simple blocks, while vertical lines with white marks "o" at each end represent basic blocks. The thick vertical lines shown in outline with the white circles "o" at their top and bottom represent the live ranges of the variables. Also, where there is a "~" at the top or bottom of a line, this shows that the live range continues into another basic block.

In Step E2, the live range interference investigation unit 16 investigates whether there is interference between the live ranges of the variables which belong to the simple block internal variable group ps1 (live range interference investigation for variables whose live ranges are completely contained within a simple block).

Figure 13A:
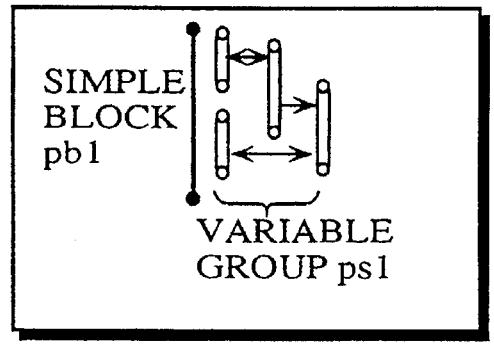
FIGS. 13A–13F are a series of figures showing the process procedure of the live range interference detection process.

FIG. 13A corresponds to the processing content of Step E2. In this figure, the variables which are members of the simple block internal variable group ps1 are shown with their live ranges in outline. Arrows have been drawn between these ranges, with these arrows showing the interference investigation for pairs of live ranges for variables which belong to the same simple block.

In the loop processes of Steps E3, E4, and E5, the live range interference investigation unit 16 judges whether the simple block pb1 belongs to the basic block bb1, and judges whether the live range of a variable v1 which belongs to the basic block internal variable group bs1 of the basic block bb1 is present in the simple block pb1 (Step E4), then investigates whether there is interference between the live range of variable v1 and the live ranges of the variables which belong to the simple block internal variable group ps1 (Step E5). Here, this live range interference investigation is between variables whose live ranges are only in one simple block and variables whose live range appear only in one basic block. The live range interference investigation unit 16 then repeats these Steps E4, E5 for the appropriate variables in the basic block internal variable group bs1 for the basic block bb1 (Step E3).

Figure 13B:
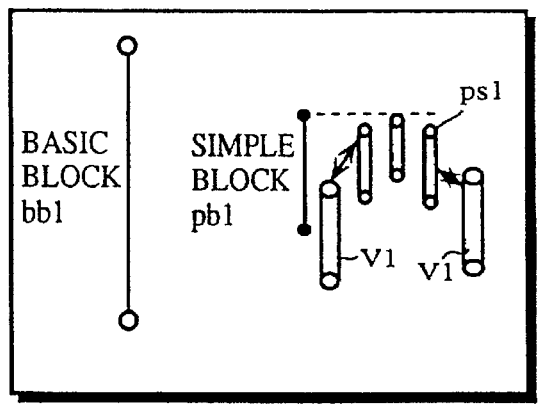

FIG. 13B corresponds to the processing content of Step E5. In this figure, the variables which are members of the simple block internal variable group ps1 and the variable v1 which belongs to the basic block internal variable group bs1 of the basic block bb1 are shown with their live ranges in outline. Arrows have been drawn between these ranges, with these arrows showing the interference investigation in Step E5 for the live ranges of variables which appear only in this simple block with the live range of the variable v1 which belongs to the basic block internal variable group bs1.

In the loop processes E6, E7, the live range interference investigation unit 16 investigates whether there is interference between the live ranges of the variables which belong to the simple block internal variable group ps1 and the live range of a variable v2 stored by the inter-basic block live range group storage unit 14 (Step E7). The live range interference investigation unit 16 repeats the process in Step E7 for all of the remaining variables stored in the inter-basic block live range group storage unit 14 (Step E6).

Figure 13C:
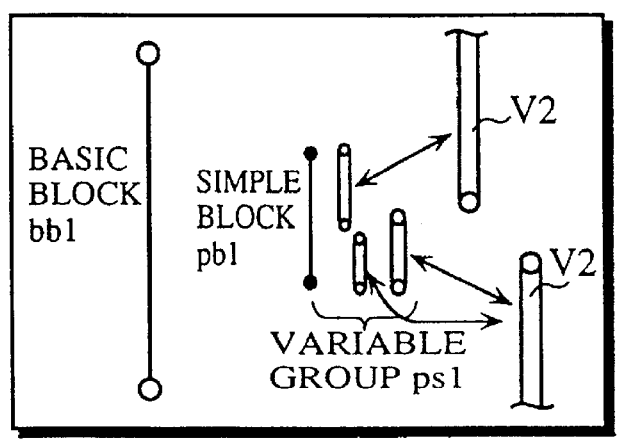

FIG. 13C corresponds to the processing content of Step E7. In this figure, the variables which are members of the simple block internal variable group ps1 and the variables v2 which belong to the inter-basic block variable group and which extend into basic block bb1 are shown with their live ranges in outline. Arrows have been drawn between these ranges, with these arrows showing the interference investigation in Step E7 for the live ranges for variables which appear only in this simple block with the live ranges of the variables v2 which belong to the inter-basic block variable group ps1.

In Step E1, the live range interference investigation unit 16 determines whether the process from Step E2 to E7 has been executed for all of the variables in the simple block internal variable group ps1 for simple block pb1 which is stored in simple block internal live range storage unit 12, and executes the processes from Step E8 through E12 if it determines that the above processing has been completed (Step E2:Yes).

In Step E8, the live range interference investigation unit 16 executes Steps E9 through E11 for all of the basic block internal variable group bs2 for the basic block bb2 in the basic block internal live range storage unit 13.

In Step E9, the live range interference investigation unit 16 investigates live range interference for the variables belonging to the basic block internal variable group bs2.

Figure 13D:
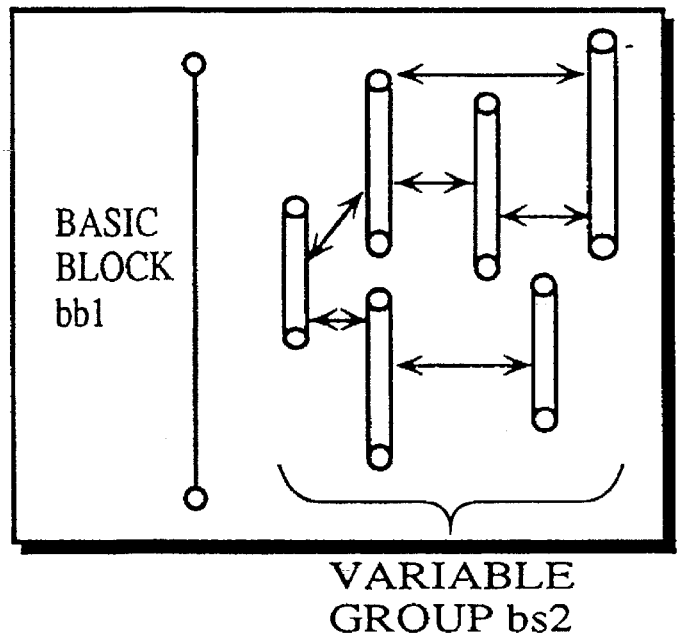

FIG. 13D corresponds to the processing content of Step E9. In this figure, the variables which are members of the basic block internal variable group bs2 are shown with their live ranges in outline. Arrows have been drawn between these ranges, with these arrows showing the interference investigation in Step E9 for the live ranges for variables which appear only in one basic block.

In Steps E10 and E11, the live range interference investigation unit 16 investigates whether there is interference between the live ranges of the variable v which belongs to the basic block internal variable group bs2 and the variable v3 which belongs to the inter-basic block variable group (Step E11), then with the live range interference investigation unit 16 repeating the investigation of Step E11 (Step E10) for all of the variables v3 stored in the inter-basic block live range group storage unit 14 whose live range is present in the basic block bb2.

Figure 13E:
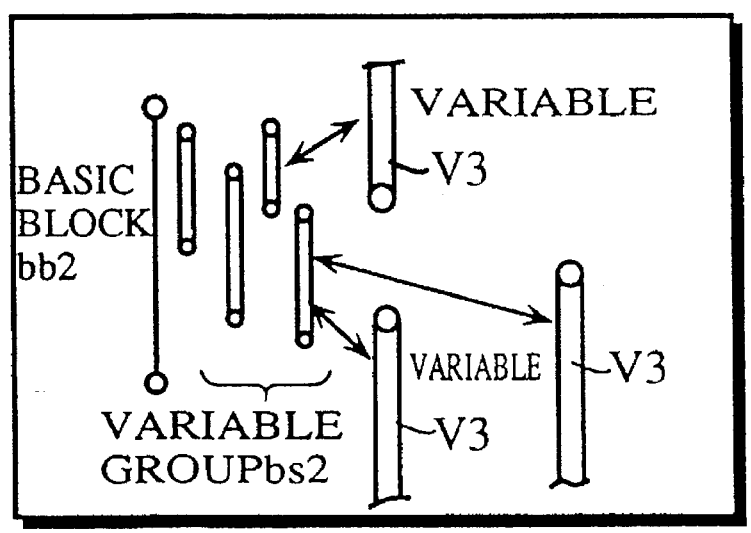

FIG. 13E corresponds to the processing content of Step E11. In this figure, the variables which are members of the basic block internal variable group bs2 and the variable v3 which belongs to the inter-basic block variable group are shown with their live ranges in outline. Arrows have been drawn between these ranges, with these arrows showing the interference investigation in Step E11 for the live ranges for variables which appear only in one basic block and the live range of the variable v3 which belongs to the inter-basic block variable group.

In Step E12, the live range interference investigation unit 16 investigates the interference between the live ranges of the variables in the inter-basic block live range group storage unit 14.

Figure 13F:
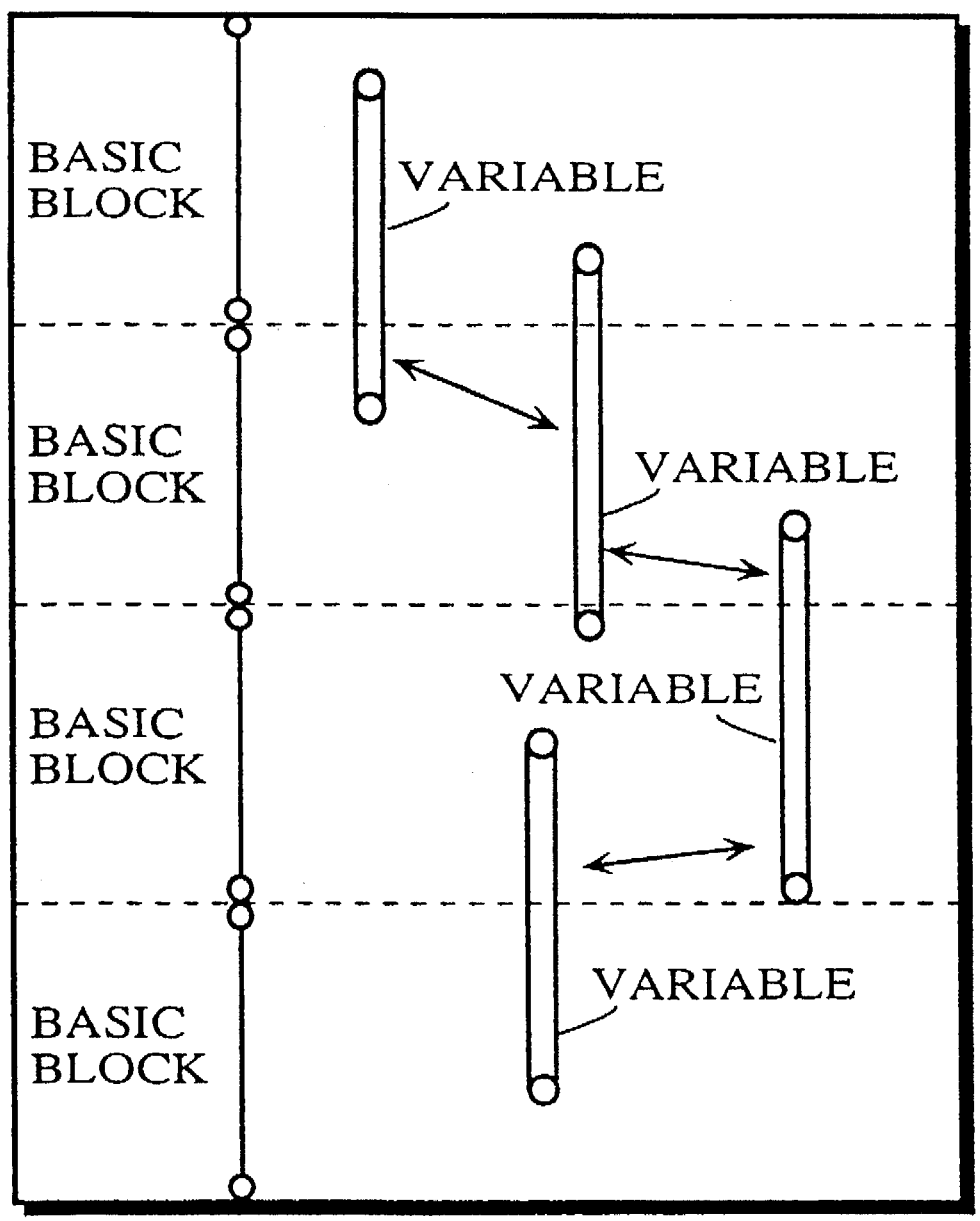

FIG. 13F corresponds to the processing content of Step E12. In this figure, the variables which are members of the inter-basic block variable group are shown with their live ranges in outline. Arrows have been drawn between these ranges, with these arrows showing the investigation in Step E12 of interference between the live ranges for variables which belong to the inter-basic block variable group.

By investigating whether there is interference according to the method shown in FIGS. 13A through 13F, then compared to the related art, such processes as the investigation of interference between the live ranges of variables which only appear in different basic blocks and the investigation of interference between the live ranges of variables which only appear in different simple blocks are omitted, resulting in reduced processing for the compiler of the present invention.

Once the live range interference investigation unit 16 has completed the investigation process as described above, then the interference of the live ranges is obtained. The detection result for the example program shown in FIG. 21 is shown in FIG. 23.

The following is an detailed explanation of the operation of the compiler of the present embodiment which is constructed as described above.

FIG. 15 shows an example of a part of a program written in C language. The variables p1, p2, and p3 shown in this figure have already defined before line 1 of this part of the program and they are not used after line 3 of the program. On the other hand, the variable s continues to be live after this example program part.

FIG. 16 shows the intermediate language program which is the output of the syntax analysis apparatus 1 for the source program shown in FIG. 15. This intermediate language program is given in 3 address format.

In FIG. 16, the control flow analysis unit 5 converts the program shown in FIG. 15 into basic blocks, generating the basic blocks shown in FIG. 17. As shown in FIG. 17, intermediate language steps s1 to s11 become basic block B1, intermediate language steps s12 to s15 become basic block B2, and intermediate language steps s16 to s18 become basic block B3.

Once the data flow analysis unit 6 has executed the data flow analysis of the intermediate language program converted in basic blocks as shown in FIG. 17, the information relating to live ranges, the definition-reference information and the reference-definition information shown in FIGS. 18A to 18C are obtained.

The simple block generation unit 8 then splits the basic block B1 into simple blocks which contain only one intermediate language step (Step A1 in the simple block generation process), with the result shown in FIG. 20A.

The simple block generation unit 8 then executes the processes shown as Steps A2 through A12 in the flowchart shown in FIG. 4, and moves the intermediate language step s1 included in the small block PB1 to the front of the small block PB2.

More specifically, the simple block generation unit 8 retrieves the small block PB1 (Step A2 in the simple block generation process) and detecting that the small block PB1 is not the final small block in basic block B1 (Step A3 in the simple block generation process), detects the intermediate language step s1 at the end of small block PB1 (Step A4 in the simple block generation process). Next, the simple block generation unit 8 detects that there is only one t1 variable defined in intermediate language step s1 (Step A5 in the simple block generation process), and detects that there is only one reference of variable t1 which is in basic block B1 by referring to the definition-reference information (Steps A6 and A7 in the simple block generation process). Next, the simple block generation unit 8 detects that there is no redefinition of variable t1 between the intermediate language step following definition s1 to the reference of variable t1, detects that there is no redefinition of the variables p1 and p2 referenced during the definition s1, between the intermediate language step following definition s1 and the reference of variable t1, and then detects that the reference of variable t1 belongs to small block PB2 (Step A10 in the simple block generation process). Then, the simple block generation unit 8 inserts the definition s1 which is an element of the small block PB1 at the start of the small block PB2 (Step A11 in the simple block generation process).

In the same way, the intermediate language steps s1 and s2 which belong to small block PB2 in FIG. 20A can be seen in FIG. 20C to have been moved to the start of small block PB7. By repeating the above process for small blocks PB3, PB4, PB5, and PB6 in order, the content of the basic block B1 is rearranged so as to change from the form shown in FIG. 20C to that shown in FIG. 20D.

Next, the simple block generation unit 8 attempts to move the variable x defined in the intermediate language step s7 at the end of small block PB7 and the variable y defined in the intermediate language step s8 at the end of small block PB8 but, since these variables x and y have 2 references each, it decides not to move the small blocks PB7 and PB8 (Step A7 in the simple block generation process). In the same way, the simple block generation unit 8 attempts to move the small block PB9 but, since there is a reference in basic block B2 of the variable z defined at s9 at the end of small block PB9, it decides not to move the small block PB9 (Step A6 in the simple block generation process). In the same way, since there is a reference in basic block B2 of the variable a defined at the final intermediate language step s10 in small block PB10, it decides not to move the small block PB10 (Step A6 in the simple block generation process), while since small block PB11 is the final small block in basic block B1, it decides not to move the small block PB11 (Step A3 in the simple block generation process). The final form of the basic block B1 after this simple block conversion is shown in FIG. 20D.

The final form of basic blocks B2 and B3 after simple block conversion by the simple block generation unit 8 in the same way as described above are shown in FIG. 21.

After the formation of simple blocks by the simple block generation unit 8, the live range generation unit 15 executes the expression of the live ranges as well as classifying all of the variables into three groups.

The following is an explanation of this process using the variables t1, y, a and b as representative examples.

First, the case for variable t1.

1. The intermediate language step s1 which is unmarked is selected by the live range generation unit 15. The live range generation unit 15 then marks the intermediate language step s1 and proceeds to the live range per definition detection process (Steps B1-B5 in the live range generation process).

2. All of the basic blocks are set as unsearched (Step B4 in the live range generation process).

3. The live range generation unit 15 investigates whether variable t1 is included in LiveOut[B1]. Since t1 is not included, the process proceeds to Step C3 in the live range per definition detection process (Step C2:No in the live range per definition detection process).

4. The live range generation unit 15 searches the basic block B1 from its exit point towards its entry point, based on the reference-definition information for definition s1, and first finds the reference s2 of variable t1 (Step C3 in the live range per definition detection process).

5. The live range generation unit 15 takes out the intermediate language step s2 and, corresponding it to variable t1, sets it as part of the live range of variable t1 (Step C4 in the live range per definition detection process).

6. Since intermediate language steps s1 and s2 belong to the same simple block PB7, the live range generation unit 15 stores the variable t1 in the simple block internal variable group for simple block PB7 in the simple block internal live range storage unit 12 (Steps C5:Yes, C6 in the live range per definition detection process).

In the way described above, the live range of the variable t1 is found, and the variable t1 is stored in the simple block internal live range storage unit 12.

Next, the case for variable y.

1. The intermediate language step s8 which is unmarked is selected by the live range generation unit 15. The live range generation unit 15 then marks the intermediate language step s8 and proceeds to the live range per definition detection process (Steps B1-B5 in the live range generation process).

2. All of the basic blocks are set as unsearched (Step B4 in the live range generation process).

3. The live range generation unit 15 investigates whether variable y is included in LiveOut[B1]. Since y is not included, the process proceeds to Step C3 in the live range per definition detection process (Steps C2:No in the live range per definition detection process).

4. The live range generation unit 15 searches the basic block B1 from its exit point towards its entry point, based on the definition-reference information for definition s8, and first finds the reference s10 of variable y (Step C3 in the live range per definition detection process).

5. The live range generation unit 15 sets the intermediate language steps s5, s6, s9, s10 as part of the live range of variable y (Step C4 in the live range per definition detection process).

6. Since the live range generation unit 15 determines that intermediate language steps s8 and s10 belong to different simple blocks, it stores the variable y in the basic block internal variable group for basic block B1 in the basic block internal live range storage unit 13 (Step CS:No, C7 in the live range per definition detection process).

In the way described above, the live range of the variable y is found, and the live range generation unit 15 stores the variable y in the basic block internal live range storage unit 13.

Next, the case for variable a.

1. The intermediate language step s10 which is unmarked is selected by the live range generation unit 15. The live range generation unit 15 then marks the intermediate language step s10 and proceeds to the live range per definition detection process (Steps B1–B5 in the live range generation process).

2. All of the basic blocks are set as unsearched (Step B4 in the live range generation process).

3. The live range generation unit 15 determines that variable a is included in LiveOut[B1] and then judges that there is no definition of variable a in the intermediate language step s11, so that it stores the variable a in the inter-basic block live range group storage unit 14, and proceeds to Step C9 in the live range per definition detection process (Steps C2:Yes, C18:No, C8 in the live range per definition detection process).

4. The live range generation unit 15 sets intermediate language step s11 in the live range of the variable a (Step C9 in the live range per definition detection process).

5. The live range generation unit 15 judges that basic block B2 has been searched and variable a belongs to LiveIn[B2], and so executes the successive block live range detection process for basic block B2 and intermediate language step s10 (Step C10 in the live range per definition detection process).

6. The live range generation unit 15 sets the basic block B3 as searched (Step D1 in the successive block live range detection process).

7. The live range generation unit 15 judges that variable a belongs to LiveOut[B2] but that variable a does not belong to Def[B2], so that the process advances to Step D3 in the successive block live range detection process (Steps D2:Yes, D8:No in the successive block live range detection process).

8. The live range generation unit 15 sets intermediate language steps s13, s12, s14, and s15 in the live range of the variable a (Step D3 in the successive block live range detection process).

9. Since the basic block B3 following after basic block B2 is yet to be searched, and it determines that variable a belongs to LiveIn[B3], the live range generation unit 15 executes the successive block live range detection process for basic block B3 and intermediate language step s10 (Step D4 in the successive block live range detection process).

10. The live range generation unit 15 sets the basic block B3 as searched (Step D1 in the successive block live range detection process).

11. The live range generation unit 15 judges that variable a does not belongs to LiveOut[B3], so that the process advances to Step D5 in the successive block live range detection process (Step D2:No in the successive block live range detection process).

12. The live range generation unit 15 searches the basic block B3 from the exit point towards the entry point and finds the reference s16 of the variable a (Step D5 in the successive block live range detection process).

13. The live range generation unit 15 sets intermediate language step s16 in the live range of the variable a (Step D6 in the successive block live range detection process).

14. The live range generation unit 15 terminates the successive block live range detection process and returns to the state shown in step "9." (Step D4 in the successive block live range detection process).

15. The live range generation unit 15 also terminates the successive block live range detection process for basic block B2 and returns to the state shown in step "5." (Step D4 in the successive block live range detection process).

16. The live range generation unit 15 refers to the definition-reference information for intermediate language step s10 and takes out the reference s12 of the variable a from this information. It also refers to the reference-definition information for the reference s12, and takes out the definition s10 for variable a on arriving at reference s12. However, since reference s10 is marked, the live range generation unit 15 does not execute Steps C10 and C11 in the live range per definition detection process.

17. After terminating the live range per definition detection process, the live range generation unit 15 returns to the state shown in step "1.". In the way described above, the live range of the variable a is found, and the live range generation unit 15 stores the variable a in the inter-basic block live range group storage unit 14.

Next, the case for the variable b.

1. The intermediate language step s11 which is unmarked is selected by the live range generation unit 15. The live range generation unit 15 then marks the intermediate language step s11 and proceeds to the live range per definition detection process (Steps B1–B5 in the live range generation process).

2. All of the basic blocks are set as unsearched (Step B4 in the live range generation process).

3. The live range generation unit 15 determines that variable b is included in LiveOut[B1] and then judges that intermediate language step s11 is the final intermediate language step in basic block B1, so that it stores the variable b in the inter-basic block live range group storage unit 14, before proceeding to Step C6 in the live range per definition detection process (Steps C2:Yes, C18:No, C8 in the live range per definition detection process).

4. The live range generation unit 15 judges that intermediate language step s11 is the final intermediate language step in basic block B1, so that it does not set anything in the live range of the variable b (Step C9 in the live range per definition detection process).

5. The live range generation unit 15 judges that variable b belongs to LiveIn[B2], and so executes the successive block live range detection process for basic block B2 and intermediate language step s11 (Step C10 in the live range per definition detection process).

6. The live range generation unit 15 sets the basic block B2 as searched (Step D1 in the successive block live range detection process).

7. The live range generation unit 15 judges that variable b belongs to Def[B2], so that the process advances to Step D5 in the successive block live range detection process (Steps D2:Yes, D8:Yes in the successive block live range detection process).

8. The live range generation unit 15 searches the basic block B2 from its exit point towards its entry point, based on the definition-reference information for definition s11, and first finds the reference s13 of variable b (Step D5 in successive block live range detection process).

9. The live range generation unit 15 then sets the intermediate language step s13 in the live range of the variable b (Step D6 in successive block live range detection process).

10. The live range generation unit 15 then terminates the successive block live range detection process, and returns to the state of step "5.".

11. The live range generation unit 15 then executes Steps C11–C16 for reference s13 (Step C11 in the live range per definition detection process).

12. The live range generation unit 15 then finds the unmarked definition s13 out of the definitions of the variable b in the reference-definition information for reference s13 (Step C12 in the live range per definition detection process).

13. The live range generation unit 15 marks the definition s13 and transfers to the start of the live range per definition detection process (Steps C13, C14 in the live range per definition detection process).

14. Since variable b is included in LiveOut[B2], the live range generation unit 15 judges whether the variable b is redefined before the end of basic block B2, and then transfers to Step C9 in the live range per definition detection process (Steps C2:Yes, C18:No and C8 in the live range per definition detection process).

15. The live range generation unit 15 adds intermediate language steps s12, s14 and s15 to the live range of variable b (Step C9 in the live range per definition detection process).

16. The live range generation unit 15 judges that the variable b belongs to LiveIn[B3], and since the basic block B3 is unsearched, executes the successive block live range detection process for basic block B3 and for intermediate language step s13 (Step C10 in the live range per definition detection process).

17. The live range generation unit 15 sets the basic block B3 as searched (Step D1 in the successive block live range detection process).

18. The live range generation unit 15 determines that variable v does not belong to LiveOut[B3], and so advances to Step D5 in the successive block live range detection process (Step D2:No in the successive block live range detection process).

19. The live range generation unit 15 searches basic block B3 from the exit point towards the entry point and finds the reference s17 of the variable b in the definition-reference information for definition s13 (Step D5 in the successive block live range detection process).

20. The live range generation unit 15 then adds intermediate language steps s16 and s17 to the live range of the variable b (Step D6 in the successive block live range detection process).

21. The live range generation unit 15 then terminates the successive block live range detection process, and returns to the state in step "16.".

22. The live range generation unit 15 then takes the intermediate language steps s13, s14, and s17 which are present in the definition-reference information for definition s13. It finds that only intermediate language step s13 is present in the reference-definition information for references s14 and s17, and that step s13 is already marked, so that it terminates this execution of the live range per definition detection process, and returns to the state in step "13." (Steps C11–C16 in the live range per definition detection process).

23. Since the live range generation unit 15 finds that the definition s11 in the reference-definition information for reference s13 is already marked, it terminates the execution of the live range per definition detection process, and returns to the state in step "1.". In this way, the live range for the variable b is found, and the variable b is stored in the inter-basic block live range group storage unit 14.

In the same way, the live range generation unit 15 executes the live range generation process for the other variables, giving the results shown in FIG. 22.

Figure 12:
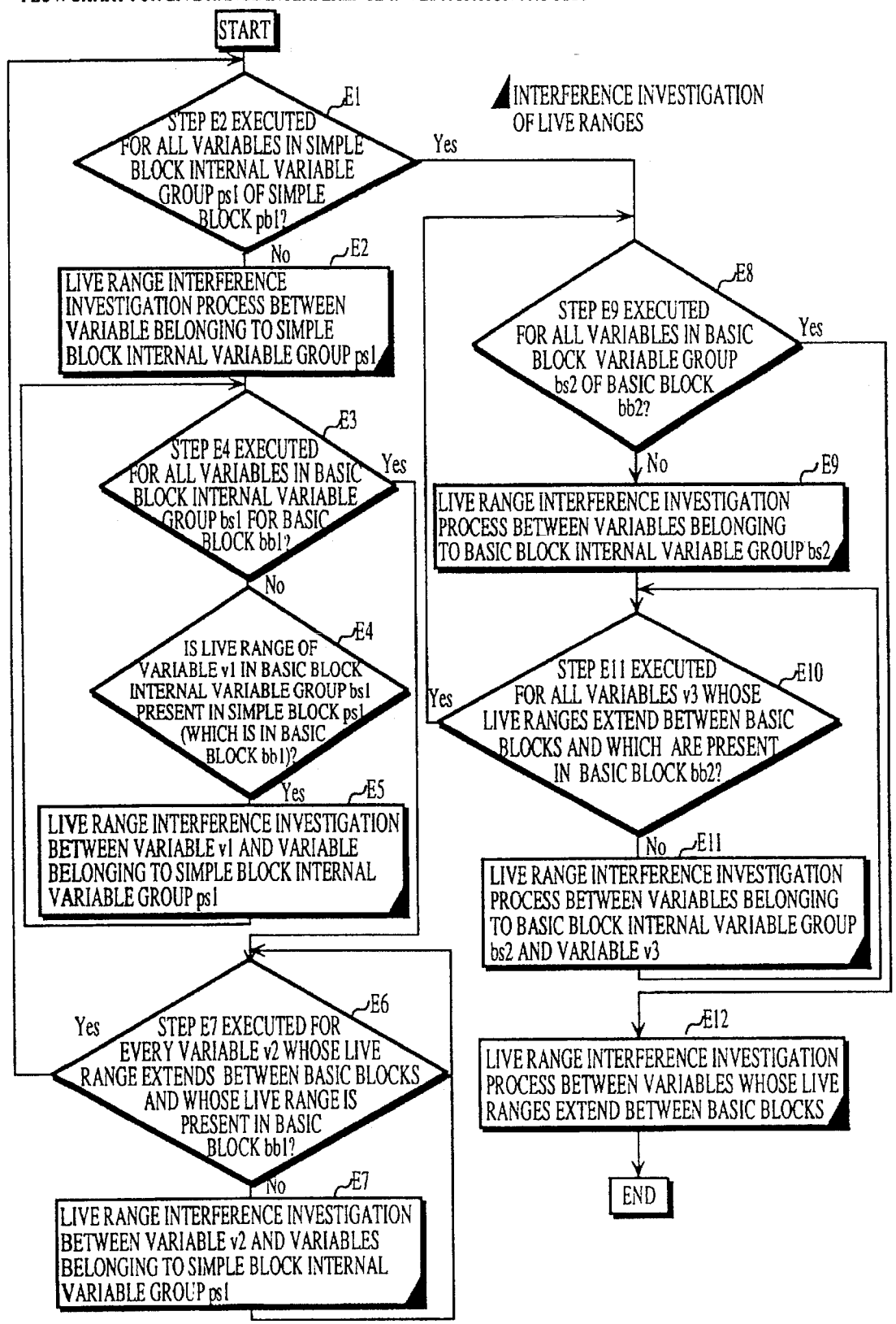
FIG. 12 is a flowchart for the live range interference detection process.

The following is an explanation of the process for the investigation of interference between the variables according to the live range interference investigation process shown in FIG. 12.

First, the live range interference investigation unit 16 performs the interference investigation for the variables whose live ranges are only present in one simple block. For example, the live range interference investigation unit 16 performs the interference investigation for the variables t3 and y4 whose live ranges are only present in simple block PB8 and, since the live ranges of variables t3 and y4 do not overlap, finds the investigation result that there is no interference between the variables t3 and y4 (Step E2 in the live range interference investigation process).

Next, the live range interference investigation unit 16 performs the interference investigation for the variables whose live ranges are only present in one basic block with the variables whose live ranges are only present in one simple block. For example, the live range interference investigation unit 16 performs the interference investigation for the variable y whose live range is only present in basic block B1 with the variables whose live ranges are only present in simple block PB9 or PB10 and finds the investigation result that there is interference between the variables y, t5 and z4 (Steps E3–E5 in the live range interference investigation process).

Next, the live range interference investigation unit 16 performs the interference investigation for the variables whose live ranges extend between basic blocks with the variables whose live ranges are only present in one simple block. For example, the live range interference investigation unit 16 performs the interference investigation for the variable a whose live range is partly included in basic block B2 with the variable c whose live range is only present in simple block PB15 and finds the investigation result that there is interference between the variables a and c (Steps E6, E7 in the live range interference investigation process).

Next, the live range interference investigation unit 16 performs the interference investigation for the variables whose live ranges are only present in one basic block. For example, the live range interference investigation unit 16 performs the interference investigation for the variables x and y whose live ranges are only present in basic block B1 and finds the investigation result that there is interference between the variables x and y (Step E9 in the live range interference investigation process).

Next, the live range interference investigation unit 16 performs the interference investigation for the variables whose live ranges extend between basic blocks with the variables whose live ranges are only present in one basic block. For example, the live range interference investigation unit 16 performs the interference investigation for the variable a whose live range is partly included in basic block B1 with the variables x, y whose live ranges are only present in basic block B1 and finds the investigation result that there is interference between the variables x and a, but not between the variables y and a (Steps E10, E11 in the live range interference investigation process).

Finally, by executing Step E12 in the live range interference investigation process, the live range interference investigation unit 16 performs the investigation of interference between variables whose live ranges extend between basic blocks. For example, the live range interference investigation unit 16 performs the interference investigation for the variables a and b, and finds the investigation result that there is interference between the variables a and b.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A compiler for compiling a program composed of a plurality of instructions into a machine language program, comprising:

jump instruction detection means for detecting jump instructions in the program and a jump destination instruction for each of the jump instructions;

division means for dividing the program into basic blocks based on the jump instructions and the jump destination instructions detected by the jump instruction detection means;

live range detection means for detecting, for every variable in the program, a live range which is a range for which a variable in the program is valid, and for expressing a detection result for each variable as a set of instruction position information showing positions of instructions included in the live range:

basic block internal live variable detection means for detecting every variable for which the live range detected by the live range detection means is positioned entirely within one of the basic blocks and for expressing a detection result for each of the basic blocks as a basic block internal live variable group corresponded to an appropriate basic block;

inter-basic block live variable detection means for detecting every variable for which the live range detected by the live range detection means extends between basic blocks and for expressing a detection result as an inter-basic block live variable group;

first live range interference judgement means for taking two variables at a time from the inter-basic block live variable group and, by finding an intersection set of sets of instruction position information corresponding to the live ranges of two variables, for judging whether there is interference between the live ranges;

second live range interference judgement means for taking two variables at a time from a basic block internal live variable group corresponded to a same basic block and, by calculating an intersection set of sets of instruction position information corresponding to the live ranges of the two variables, for judging whether there is interference between the live ranges; and third live range interference judgement means for taking one variable at a time from a basic block internal live variable group corresponded to a basic block and one variable at a time from the inter-basic block live variable group and, by calculating an intersection set of sets of instruction position information corresponding to the live ranges of the two variables, for judging whether there is interference between the live ranges, wherein the compiler executes resource assignment using judgement results of the first, the second and the third live range interference judgement means.

2. The compiler of claim 1, further comprising:

simple block formation means for forming simple blocks inside each basic block, each of which is a series of instructions including at least one pair of a definition instruction which is an instruction setting a value of a variable and a reference instruction which is an instruction using the variable set by the definition instruction;

simple block internal live variable detection means for detecting every variable in the basic block internal live variable groups whose live range is included in only one of the simple blocks, and for expressing a detection result for each of the simple blocks as a simple block internal live variable group corresponded to an appropriate simple block; and inter-simple block live variable detection means for detecting every variable in the basic block internal live variable groups whose live range extends between simple blocks, and for expressing a detection result as an inter-simple block live variable group for an appropriate basic block, wherein the second live range interference judgement means includes:

a first live range interference judgement unit for taking two variables at a time from one of the inter-simple block live variable groups and, by calculating an intersection set of sets of instruction position information corresponding to the live ranges of the two variables, for judging whether there is interference between the live ranges;

a second live range interference judgement unit for taking two variables at a time from a simple block internal live variable group corresponded to a same simple block and, by calculating an intersection set of sets of instruction position information corresponding to the live ranges of the two variables, for judging whether there is interference between the live ranges; and a third live range interference judgement unit for taking one variable at a time from a simple block internal live variable group corresponded to a simple block and one variable at a time from the inter-simple block live variable group and, by calculating an intersection set of sets of instruction position information corresponding to the live ranges of the two variables, for judging whether there is interference between the live ranges.

3. The compiler of claim 2, wherein the simple block generation means includes:

definition instruction extraction means for extracting one definition instruction at a time from one of the basic blocks formed by the division means;

corresponding reference instruction detection means for detecting a reference instruction corresponding to the definition instruction from the basic block including the definition instruction extracted by the definition instruction extraction means;

definition instruction movement possibility judgement means for judging whether it is possible to move the definition instruction to a position of the reference instruction detected by the corresponding reference instruction detection means;

definition instruction movement means for moving, when the definition instruction movement possibility judgement means judges that movement is possible, the definition instruction for which movement is judged by the definition instruction movement possibility judgement means to be possible to a point just before the reference instruction corresponding to the definition instruction and for synthesizing the definition instruction and the reference instruction into one simple block; and simple block remaining instruction movement means for moving, when the definition instruction moved by the definition instruction movement means before movement is a final instruction in a simple block, every remaining instruction in a same simple block as the definition instruction moved by the definition instruction movement means before movement to a point just before a movement destination of the definition instruction and for synthesizing every remaining instruction into a destination simple block.

4. The compiler of claim 3, wherein
the definition instruction movement possibility judgement means includes:

variable singular/plural judgement unit for judging whether a variable whose value is set by the definition instruction extracted by the definition instruction extraction means is singular;

reference singular/plural judgement unit for judging, when the variable singular/plural judgement unit judges that the variable is singular, whether there is only one reference instruction detected by the corresponding reference instruction detection means;

a first resetting validity judgement unit for judging, when the reference singular/plural judgement unit judges that there is only one reference instruction, whether the variable whose value is set in the definition instruction corresponding to the reference instruction is reset during a part of the program from the definition instruction to the reference instruction;

definition instruction used variable detection unit for detecting, when the first resetting validity judgement unit judges that there is no resetting, any variables used in the definition instruction;

a second resetting validity judgement unit for judging whether any variables detected by the definition instruction used variable detection unit are reset during a part of the program from the definition instruction to the reference instruction;

a movement possibility judgement unit for judging, when the second resetting validity judgement unit judges that there is no resetting, that the definition instruction can be moved to a position of the reference instruction.

5. The compiler of claim 4, wherein
the third live range interference judgement means includes:

a fourth live range interference judgement unit for taking one variable at a time from the inter-basic block live variable group and one variable at a time from a simple block internal live variable group corresponded to a simple block and, by finding an intersection set of the sets of instruction position information corresponding to the live ranges of the two variables, for judging whether there is interference between the live ranges; and a fifth live range interference judgement unit for taking one variable at a time from the inter-basic block live variable group and one variable at a time from the inter-simple block live variable group and, by finding an intersection set of the sets of instruction position information corresponding to the live ranges of the two variables, for judging whether there is interference between the live ranges.

6. The compiler of claim 5, further comprising valid variable information storage means for storing variables valid at an entry point of a basic block and variables valid at an exit point of a basic block, corresponded with each basic block in the program, wherein the live range detection means includes:

a definition instruction extraction unit for extracting one definition instruction in the program at a time;

an exit point invalidity judgement unit for detecting a basic block including a definition instruction extracted by the definition extraction unit and the variable defined by definition instruction and for judging whether a set value of the detected variable is invalid at an exit point of the basic block, based on a stored content of the valid variable information storage means;

an exit point closest reference instruction detection unit for detecting, when the exit point invalidity judgement unit detects that the set value is invalid, a reference instruction corresponding to the definition instruction which is closest to the exit point of the basic block;

a basic block internal instruction position detection unit for detecting all of the instruction position information from an instruction following after the definition instruction to the reference instruction detected by the exit point closest reference instruction detection unit; and a basic block internal live range expression unit for expressing a live range of the variable whose instruction position information was detected as all of the instruction position information detected by the basic block internal instruction position detection unit, wherein the basic block internal live variable detection means sets the variable whose live range is expressed by the basic block internal live range expression unit as a member of the basic block internal live variable group corresponding to a basic block which includes the variable.

7. The compiler of claim 6, further comprising a basic block internal definition information storage means for storing each basic block corresponded with any variables defined in each basic block, wherein the live range detection means includes:

a resetting validity judgement unit for judging, when the exit point invalidity judgement unit judges that the variable is valid, whether the variable defined in a definition instruction judged to be valid by the exit point invalidity judgement means is reset during the period from the definition instruction to an exit point of a basic block including the definition instruction, based on a stored content of the basic block internal definition information storage means;

an exit point validity position information detection unit for detecting, when the resetting validity judgement unit judges that there is no resetting, instruction position information from an instruction following the definition instruction to the exit point of the basic block;

a live basic block detection unit for detecting, when the resetting validity judgement unit judges that there is no resetting, every basic block, out of basic blocks following in order after the basic block including the definition instruction, in which the variable is valid at an entry point and at an exit point with no resetting of the variable in between, based on stored contents of the valid variable information storage means and of the basic block internal definition information storage means;

an inter-basic block position information detection unit for detecting all instruction position information included in the basic block retrieved by the live basic block detection unit, based on a stored content of the basic block internal definition information storage means;

a final basic block detection unit for detecting, when the resetting validity judgement unit judges that there is no resetting, a basic block for which the value of the variable is valid at an entry point but is invalid at an exit point, out of all the basic blocks following in order after the basic block which includes the definition instruction;

a final reference instruction detection unit for detecting a final reference instruction corresponding to the definition instruction in the basic block detected by the final basic block detection unit;

an entry point validity position information detection unit for detecting all instruction position information from an entry point of the basic block detected by the final basic block detection unit to the reference instruction detected by the final reference instruction detection unit; and an inter-basic block live range expression unit for expressing a total live range of the variable judged by the resetting validity judgement unit as not being reset as a total of a detection result of the exit point validity position information detection means, a detection result of the entry point validity position information detection means, and a detection result of the inter-basic block position information detection means, wherein the inter-basic block live variable detection means sets the variable, judged by the resetting validity judgement means as not being reset, as a member of the inter-basic block live variable group.

8. The compiler of claim 7, further comprising reference-definition information storage means for storing information for each instruction position in the program corresponded with any variables used at each instruction position and instruction position information of instructions defining the variables, wherein the live range detection means includes:

a marking unit for adding identification information to a position of a definition instruction extracted by the definition instruction extraction unit;

a reference variable detection unit for detecting a variable used in a reference instruction corresponding to a definition instruction extracted by the definition instruction extraction unit;

a definition instruction detection unit for detecting all definition instructions which set a set value to the variable detected by the reference variable detection unit, based on a stored content of the reference-definition information storage means;

a non-marked definition instruction extraction unit for detecting a definition instruction which has not been marked with identification information by the marking unit, out of all the definition instructions detected by the definition instruction detection unit;

a first branch block internal position information detection unit for detecting all instruction position information from an instruction following the definition instruction detected by non-marked definition instruction extraction unit to an exit point of the basic block including the definition instruction; and a first instruction position information addition unit for adding the instruction position information detected by the first branch block internal position information detection unit to the instruction position information expressed by the inter-basic block live range expression unit.

9. The compiler of claim 8, further comprising definition-reference information storage unit for storing information for each instruction position in the program corresponded with any variables defined at each instruction position and instruction position information of instructions using the variables, wherein the live range detection means includes:

a branch block internal reference instruction detection unit for detecting a reference instruction corresponding to the definition instruction detected by the non-marked definition instruction extraction unit, based on a stored content of the definition-reference information storage unit;

a branch block detection unit for detecting a basic block including the reference instruction detected by the branch block internal reference instruction detection unit;

a second branch block internal position information detection unit for detecting all instruction position information from an entry point of the basic block detected by branch block detection unit to the reference instruction detected by the branch block internal reference instruction detection unit; and a second instruction position information addition unit for adding the instruction position information detected by the second branch block internal position information detection unit to the group of instruction position information expressed by the inter-basic block expression unit.

10. A compiler for compiling a program, composed of a plurality of instructions, in which a number of simple blocks each of which is a series wherein at least one pair of a definition instruction for setting a value of a variable and a reference instruction which uses the value of the variable set by the definition variable are arranged in order, into a machine language program for which every variable in the program is assigned to one of registers and memory, comprising:

jump instruction detection means for detecting jump instructions in the program and a jump destination instruction for each of the jump instruction;

division means for dividing the program into basic blocks based on the jump instructions and the jump destination instructions detected by the jump instruction detection means;

definition instruction extraction means for extracting, once the program has been divided into basic blocks, one definition instruction at a time from a basic block;

corresponding reference instruction detection means for detecting, once a definition instruction has been extracted, a reference instruction using a variable whose value is set by the definition instruction from the basic block including the definition instruction extracted by the definition instruction extraction means;

definition instruction movement possibility judgement means for judging, once the reference instruction has been detected, whether it is possible to move the definition instruction to a position of the reference instruction detected by the corresponding reference instruction detection means;

definition instruction movement means for moving, the definition instruction for which movement is judged by the definition instruction movement possibility judgement means to be possible to a point just before the reference instruction corresponding to the definition instruction and for synthesizing the definition instruction and the reference instruction into one simple block; and simple block remaining instruction movement means for moving, when the definition instruction moved by the definition instruction movement means before movement is a final instruction in a simple block, every remaining instruction in a same simple block as the definition instruction moved by the definition instruction movement means before movement to a point just before a movement destination of the definition instruction and for synthesizing every remaining instruction into a destination simple block; and resource assignment means for assigning, once the definition instruction extraction means has extracted every definition instruction, all variables whose live ranges interfere with one another to different registers.

11. The compiler of claim 10, wherein
the definition instruction movement possibility judgement means includes:

variable singular/plural judgement unit for judging whether a variable whose value is set by the definition instruction extracted by the definition instruction extraction means is singular;

reference singular/plural judgement unit for judging, when the variable singular/plural judgement unit judges that the variable is singular, whether there is only one reference instruction detected by the corresponding reference instruction detection means;

a first resetting validity judgement unit for judging, when the reference singular/plural judgement unit judges that there is only one reference instruction, whether the variable whose value is set in the definition instruction corresponding to the reference instruction is reset during a part of the program from the definition instruction to the reference instruction;

definition instruction used variable detection unit for detecting, when the first resetting validity judgement unit judges that there is no resetting, any variables used in the definition instruction;

a second resetting validity judgement unit for judging whether any variables detected by the definition instruction used variable detection unit are reset during the part of the program from the definition instruction to the reference instruction; and a movement possibility judgement unit for judging, when the second resetting validity judgement unit judges that there is no resetting, that the definition instruction can be moved to a position of the reference instruction.

12. The compiler of claim 11, wherein
the resource assignment means includes:

live range detection means for detecting, for every variable in the program, a live range which is a range for which a variable in the program is valid, and for expressing a detection result as a set of instruction position information showing positions of instructions included in the live range;

basic block internal live variable detection means for detecting every variable for which the live range detected by the live range detection means is positioned entirely within one of the basic blocks and for expressing a detection result as a basic block internal live variable group corresponded to an appropriate basic block;

inter-basic block live variable detection means for detecting every variable for which the live range detected by the live range detection means extends between basic blocks and for expressing a detection result as an inter-basic block live variable group;

first live range interference judgement means for taking two variables at a time from the inter-basic block live variable group and, by calculating an intersection set of sets of instruction position information corresponding to the live ranges of the two variables, for judging whether there is interference between the live ranges;

second live range interference judgement means for taking two variables at a time from a basic block internal live variable group corresponded to a same basic block and, by calculating an intersection set of sets of instruction position information corresponding to the live ranges of the two variables, for judging whether there is interference between the live ranges; and third live range interference judgement means for taking one at a time variable from a basic block internal live variable group corresponded to a basic block and one variable at a time from the inter-basic block live variable group and, by calculating an intersection set of the sets of instruction position information corresponding to the live ranges of the two variables, for judging whether there is interference between the live ranges; and assignment means for assigning variables whose live ranges interfere with one another to different registers by using judgement results of the first, the second and the third live range interference judgement means.

13. The compiler of claim 12, wherein
the resource assigning means further includes:

simple block internal live variable detection means for detecting every variable in the basic block internal live variable group whose live range is included in only one of the simple blocks, and for expressing a detection result as a simple block internal live variable group corresponded to an appropriate simple block; and inter-simple block live variable detection means for detecting every variable in the basic block internal live variable group whose live range extends between simple blocks, and for expressing a detection result as an inter-simple block live variable group, wherein the second live range interference judgement means includes:

a first live range interference judgement unit for taking two variables at a time from the inter-simple block live variable group and, by calculating an intersection set of the sets of instruction position information corresponding to the live ranges of the two variables, for judging whether there is interference between the live ranges;

a second live range interference judgement unit for taking two variables at a time from a simple block internal live variable group corresponded to a same simple block and, by calculating an intersection set of the sets of instruction position information corresponding to the live ranges of the two variables, for judging whether there is interference between the live ranges; and a third live range interference judgement unit for taking one variable from a simple block internal live variable group corresponded to a simple block and one variable from the inter-simple block live variable group and, by calculating an intersection set of the sets of instruction position information corresponding to the live ranges of the two variables, for judging whether there is interference between the live ranges.

14. The compiler of claim 13, wherein
the third live range interference judgement means includes:
a fourth live range interference judgement unit for taking one variable at a time from the inter-basic block live variable group and one variable at a time from a simple block internal live variable group corresponded to a simple block and, by finding an intersection set of the sets of instruction position information corresponding to the live ranges of the two variables, for judging whether there is interference between the live ranges; and
a fifth live range interference judgement unit for taking one variable at a time from the inter-basic block live variable group and one variable at a time from the inter-simple block live variable group and, by finding an intersection set of the sets of instruction position information corresponding to the live ranges of the two variables, for judging whether there is interference between the live ranges.

15. The compiler of claim 14, further comprising valid variable information storage means for storing variables valid at an entry point of a basic block and variables valid at an exit point of a basic block, corresponded with each basic block in the program,
wherein the live range detection means includes:
a definition instruction extraction unit for extracting one definition instruction in the program at a time;
an exit point invalidity judgement unit for detecting a basic block including a definition instruction extracted by the definition extraction unit and the variable defined by definition instruction and for judging whether a set value of the detected variable is invalid at an exit point of the basic block, based on a stored content of the valid variable information storage means;
an exit point closest reference instruction detection unit for detecting, when the exit point invalidity judgement unit detects that the set value is invalid, a reference instruction corresponding to the definition instruction which is closest to the exit point of the basic block;
a basic block internal instruction position detection unit for detecting all of the instruction position information from an instruction following after the definition instruction to the reference instruction detected by the exit point closest reference instruction detection unit; and
a basic block internal live range expression unit for expressing a live range of the variable whose instruction position information was detected as all of the instruction position information detected by the basic block internal instruction position detection unit,
wherein the basic block internal live variable detection means sets the variable whose live range is expressed by the basic block internal live range expression unit as a member of the basic block internal live variable group corresponding to a basic block which includes the variable.

16. The compiler of claim 15, further comprising a basic block internal definition information storage means for storing each basic block corresponded with any variables defined in each basic block, wherein
the live range detection means includes:
a resetting validity judgement unit for judging, when the exit point invalidity judgement unit judges that the variable is valid, whether the variable defined in a definition instruction judged to be valid by the exit point invalidity judgement means is reset during the period from the definition instruction to an exit point of a basic block including the definition instruction, based on a stored content of the basic block internal definition information storage means;
an exit point validity position information detection unit for detecting, when the resetting validity judgement unit judges that there is no resetting, instruction position information from an instruction following the definition instruction to the exit point of the basic block;
a live basic block detection unit for detecting, when the resetting validity judgement unit judges that there is no resetting, every basic block, out of basic blocks following in order after the basic block including the definition instruction, in which the variable is valid at an entry point and at an exit point with no resetting of the variable in between, based on stored contents of the valid variable information storage means and of the basic block internal definition information storage means;
an inter-basic block position information detection unit for detecting all instruction position information included in the basic block retrieved by the live basic block detection unit, based on a stored content of the basic block internal definition information storage means;
a final basic block detection unit for detecting, when the resetting validity judgement unit judges that there is no resetting, a basic block for which the value of the variable is valid at an entry point but is invalid at an exit point, out of all the basic blocks following in order after the basic block which includes the definition instruction;
a final reference instruction detection unit for detecting a final reference instruction corresponding to the definition instruction in the basic block detected by the final basic block detection unit;
an entry point validity position information detection unit for detecting all instruction position information from an entry point of the basic block detected by the final basic block detection unit to the reference instruction detected by the final reference instruction detection unit; and
an inter-basic block live range expression unit for expressing a total live range of the variable judged by the resetting validity judgement unit as not being reset as a total of a detection result of the exit point validity position information detection means, a detection result of the entry point validity position information detection means, and a detection result of the inter-basic block position information detection means,
wherein the inter-basic block live variable detection means sets the variable, judged by the resetting validity judgement means as not being reset, as a member of the inter-basic block live variable group.

17. The compiler of claim 16, further comprising reference-definition information storage means for storing information for each instruction position in the program corresponded with any variables used at each instruction position and instruction position information of instructions defining the variables, wherein the live range detection means includes:

a marking unit for adding identification information to a position of a definition instruction extracted by the definition instruction extraction unit;

a reference variable detection unit for detecting a variable used in a reference instruction corresponding to a definition instruction extracted by the definition instruction extraction unit;

a definition instruction detection unit for detecting all definition instructions which set a set value to the variable detected by the reference variable detection unit, based on a stored content of the reference-definition information storage means;

a non-marked definition instruction extraction unit for detecting a definition instruction which has not been marked with identification information by the marking unit, out of all the definition instructions detected by the definition instruction detection unit;

a first branch block internal position information detection unit for detecting all instruction position information from an instruction following the definition instruction detected by non-marked definition instruction extraction unit to an exit point of the basic block including the definition instruction; and a first instruction position information addition unit for adding the instruction position information detected by the first branch block internal position information detection unit to the instruction position information expressed by the inter-basic block live range expression unit.

18. The compiler of claim 17, further comprising definition-reference information storage unit for storing information for each instruction position in the program corresponded with any variables defined at each instruction position and instruction position information of instructions using the variables, wherein the live range detection means includes:

a branch block internal reference instruction detection unit for detecting a reference instruction corresponding to the definition instruction detected by the non-marked definition instruction extraction unit, based on a stored content of the definition-reference information storage unit;

a branch block detection unit for detecting a basic block including the reference instruction detected by the branch block internal reference instruction detection unit;

a second branch block internal position information detection unit for detecting all instruction position information from an entry point of the basic block detected by branch block detection unit to the reference instruction detected by the branch block internal reference instruction detection unit; and a second instruction position information addition unit for adding the instruction position information detected by the second branch block internal position information detection unit to the group of instruction position information expressed by the inter-basic block expression unit.

* * * * *